United States Patent
He et al.

(10) Patent No.: US 12,216,871 B2
(45) Date of Patent: Feb. 4, 2025

(54) TOUCH PANEL AND MANUFACTURING METHOD THEREFOR, AND DISPLAY TOUCH DEVICE

(71) Applicants: Chengdu BOE Optoelectronics Technology Co., Ltd., Sichuan (CN); BOE Technology Group Co., Ltd., Beijing (CN)

(72) Inventors: Xinglong He, Beijing (CN); Changshuai Fang, Beijing (CN); Zhangmin Wu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/916,046

(22) PCT Filed: Nov. 19, 2021

(86) PCT No.: PCT/CN2021/131593
§ 371 (c)(1),
(2) Date: Sep. 30, 2022

(87) PCT Pub. No.: WO2022/156341
PCT Pub. Date: Jul. 28, 2022

(65) Prior Publication Data
US 2024/0211083 A1    Jun. 27, 2024

(30) Foreign Application Priority Data
Jan. 20, 2021    (CN) .......................... 202110075757.7

(51) Int. Cl.
*G06F 3/044*    (2006.01)
*G06F 3/041*    (2006.01)

(52) U.S. Cl.
CPC .......... *G06F 3/0446* (2019.05); *G06F 3/0416* (2013.01); *G06F 2203/04103* (2013.01)

(58) Field of Classification Search
CPC ......... B32B 15/20; B32B 23/00; B32B 27/08; B32B 27/281; B32B 27/286;
(Continued)

(56) References Cited

U.S. PATENT DOCUMENTS

2016/0062503 A1    3/2016  Lee et al.
2018/0053816 A1    2/2018  Choi et al.
(Continued)

FOREIGN PATENT DOCUMENTS

CN    106354314 A    1/2017
CN    108598287 A    9/2018
(Continued)

OTHER PUBLICATIONS

International Search Report for PCT/CN2021/131593 Mailed Feb. 17, 2022.
(Continued)

*Primary Examiner* — Nelson M Rosario
(74) *Attorney, Agent, or Firm* — Ling Wu; Stephen Yang; Ling and Yang Intellectual Property

(57) ABSTRACT

Disclosed in the exemplary embodiments of the present disclosure are a touch panel and a manufacturing method therefor, and a display touch device. The touch panel comprises a flat region, bending regions located on at least two adjacent sides of the flat region, and a deformation region located between the adjacent bending regions; a touch structure is provided in the flat region, the bending regions and the deformation region, and the deformation region is provided with at least two crack guide grooves; in a plane parallel to the touch panel, the shape of the crack guide grooves includes a strip shape extending in extending direc-
(Continued)

tions, and the extending directions of the at least two crack guide grooves intersect.

18 Claims, 8 Drawing Sheets

(58) Field of Classification Search
CPC ... B32B 27/302; B32B 27/304; B32B 27/308; B32B 27/365; B32B 3/02; B32B 9/00; B32B 9/04; B32B 9/041; B32B 9/045; B32B 2255/10; B32B 2255/20; B32B 2255/24; B32B 2307/202; B32B 2307/206; B32B 2307/412; B32B 2307/546; B32B 2307/7244; B32B 2307/7265; B32B 2457/20; H10K 59/87; H10K 77/111; H10K 2102/302; H10K 2102/311; H10K 59/12; H10K 59/871
See application file for complete search history.

(56) References Cited

U.S. PATENT DOCUMENTS

| | | | |
|---|---|---|---|
| 2018/0300015 A1* | 10/2018 | Heo | G06F 3/0412 |
| 2019/0179466 A1 | 6/2019 | Kim et al. | |
| 2020/0176696 A1 | 6/2020 | Dai | |
| 2020/0333918 A1 | 10/2020 | Lin et al. | |
| 2021/0091320 A1* | 3/2021 | Choi | H10K 50/844 |
| 2022/0077242 A1* | 3/2022 | Yoon | G06F 1/1643 |
| 2022/0123064 A1 | 4/2022 | Cao et al. | |
| 2022/0209148 A1 | 6/2022 | Park et al. | |

FOREIGN PATENT DOCUMENTS

| | | | |
|---|---|---|---|
| CN | 108646952 A | 10/2018 | |
| CN | 108766977 A | 11/2018 | |
| CN | 109032414 A | 12/2018 | |
| CN | 109508118 A | 3/2019 | |
| CN | 110021635 A | 7/2019 | |
| CN | 110286794 A | 9/2019 | |
| CN | 111179777 A | 5/2020 | |
| CN | 111261642 A | 6/2020 | |
| CN | 111584595 A | 8/2020 | |
| CN | 112234090 A | 1/2021 | |
| CN | 112711354 A | 4/2021 | |
| WO | 2020218704 A1 | 10/2020 | |

OTHER PUBLICATIONS

Office Action dated May 24, 2022 for Chinese Patent Application No. 202110075757.7 and English Translation.
Decesion to grant dated Dec. 5, 2022 for Chinese Patent Application No. 202110075757.7 and English Translation.

* cited by examiner

TOUCH PANEL AND MANUFACTURING METHOD THEREFOR, AND DISPLAY TOUCH DEVICE

CROSS-REFERENCE TO RELATED APPLICATIONS

The present application is a U.S. National Phase Entry of International Application PCT/CN2021/131593 having an international filing date of Nov. 19, 2021, which claims priority of Chinese Patent Application No. 202110075757.7 filed to the China National Intellectual Property Administration (CNIPA) on Jan. 20, 2021 and entitled "Touch Panel and Manufacturing Method Therefor, and Display Touch Device", and the contents disclosed in the above-mentioned applications are hereby incorporated as a part of this application.

TECHNICAL FIELD

The present disclosure relates to, but is not limited to, the field of touch control technologies, and particularly to a touch panel, a method for manufacturing the touch panel, and a display touch apparatus.

BACKGROUND

At present, touch screens have gradually spread all over people's lives. According to composition structures, types of touch screens may be divided into Add on Mode type, On Cell type, In Cell type, and so on. According to working principles thereof, types of touch screens may be divided into capacitive type, resistive type, infrared type, surface acoustic wave type, and so on. Capacitive On Cell type is a touch control structure formed on a light exit surface of a display screen, and the Capacitive On Cell type has gradually became a mainstream technology due to advantages such as simple structure, small thickness, high transmittance, etc.

SUMMARY

The following is a summary of subject matter described herein in detail. The summary is not intended to limit the protection scope of claims.

An exemplary embodiment of the present disclosure provides a touch panel, including a flat region, bending regions located on at least two adjacent sides of the flat region and a deformation region located between the adjacent bending regions; the flat region, the bending regions and the deformation region are provided with a touch control structure, and the deformation region is provided with at least two crack guide grooves; on a plane parallel to the touch panel, a shape of each crack guide groove includes a strip shape extending along an extension direction, and extension directions of at least two crack guide grooves intersect with each other.

In an exemplary embodiment, the adjacent bending regions includes a first bending region extending in a first direction and a second bending region extending in a second direction; the deformation region includes a first sub-region adjacent to the first bending region, a second sub-region adjacent to the second bending region, and a central sub-region between the first sub-region and the second sub-region, wherein the first direction intersects with the second direction; and the extension directions of the crack guide grooves in the first sub-region, the second sub-region and the central sub-region intersect with each other.

In an exemplary embodiment, a crack guide groove in the first sub-region has a strip shape extending along a first extension direction, and an included angle between the first extension direction and the first direction is 75 degrees to 105 degrees.

In an exemplary embodiment, a crack guide groove in the second sub-region has a strip shape extending along a second extension direction, and an included angle between the second extension direction and the second direction is 75 degrees to 105 degrees.

In an exemplary embodiment, a crack guide groove in the central sub-region has a strip shape extending along a third extension direction, and an included angle between the third extension direction and the first direction is 30 degrees to 60 degrees, or, an included angle between the third extension direction and the second direction is 30 degrees to 60 degrees.

In an exemplary embodiment, the extension directions of the crack guide grooves gradually change in a direction from the first sub-region to the second sub-region.

In an exemplary embodiment, the deformation region includes an inner arc edge adjacent to the flat region and an outer arc edge away from the flat region, and an extension direction of at least one crack guide groove is perpendicular to the inner arc edge or perpendicular to the outer arc edge.

In an exemplary embodiment, a length of the crack guide groove in the extension direction is greater than a width of the crack guide groove in a direction perpendicular to the extension direction, and a ratio of the length to the width is 3 to 7.

In an exemplary embodiment, the length is 40 μm to 60 μm and the width is 8 μm to 12 μm.

In an exemplary embodiment, the flat region, the bending regions and the deformation region are each provided with a mutual capacitance touch module; or, the flat region, the bending regions and the deformation region are each provided with a self-capacitance touch module; or, the flat region is provided with a mutual capacitance touch module, and the bending regions and the deformation region are provided with self-capacitance touch modules; or, the flat region and the bending region are provided with mutual capacitance touch modules, and the deformation region is provided with a self-capacitance touch module.

In an exemplary embodiment, the self-capacitance touch module includes a conductive layer disposed on a touch substrate and a protection layer disposed on a side of the conductive layer away from the touch substrate; the conductive layer includes multiple electrode sub-regions and multiple lead sub-regions, the electrode sub-regions and the lead sub-regions are alternately arranged along the second direction, at least one electrode sub-region includes multiple touch electrodes sequentially arranged along the first direction, at least one lead sub-region includes multiple sub-leads sequentially arranged along the second direction, and the multiple sub-leads are correspondingly connected with the multiple touch electrodes; at least one of the touch substrate and the protection layer in the crack guide grooves is removed, or at least one of the touch substrate, the conductive layer and the protection layer in the crack guide grooves is removed.

In an exemplary embodiment, the self-capacitance touch module includes a lead layer disposed on a touch substrate, an insulating layer disposed on a side of the lead layer away from the touch substrate, a conductive layer disposed on a side of the insulating layer away from the touch substrate and a protection layer disposed on a side of the conductive layer away from the touch substrate; the lead layer includes multiple sub-leads sequentially arranged along the second direction, the conductive layer includes multiple touch electrodes sequentially arranged along the first direction, and the multiple touch electrodes are correspondingly connected with the multiple sub-leads through vias; at least one of the touch substrate, the insulating layer and the protection layer in the crack guide grooves is removed, or at least one of the touch substrate, the insulating layer, the conductive layer and the protection layer in the crack guide grooves is removed.

In an exemplary embodiment, the deformation region includes an electrode region and a lead region, and the electrode region includes the first sub-region, the second sub-region and the central sub-region; the lead region at least includes a lead region between the electrode region and the first bending region and a lead region between the electrode region and the flat region.

An exemplary embodiment of the present disclosure further provides a display touch apparatus including the aforementioned touch panel.

An exemplary embodiment of the present disclosure further provides a method for manufacturing a touch panel, wherein the touch panel includes a flat region, bending regions located on at least two adjacent sides of the flat region, and a deformation region located between the adjacent bending regions, and the method includes:

forming a touch control structure in the flat region, the bending regions and the deformation region;

forming at least two crack guide grooves in the deformation region; on a plane parallel to the touch panel, a shape of a crack guide groove includes a strip shape extending along an extension direction, and extension directions of at least two crack guide grooves intersect with each other.

In an exemplary embodiment, forming the touch control structure in the flat region, the bending regions and the deformation region includes:

forming mutual capacitance touch modules in the flat region, the bending regions and the deformation region; or, forming self-capacitance touch modules in the flat region, the bending regions and the deformation region; or forming a mutual capacitance touch module in the flat region, and forming self-capacitance touch modules in the bending regions and the deformation region; or, forming mutual capacitance touch modules in the flat region and the bending regions, and forming a self-capacitance touch module in the deformation region.

In an exemplary embodiment, forming the self-capacitance touch module in the deformation region includes: forming a conductive layer on the touch substrate; wherein the conductive layer includes multiple electrode sub-regions and multiple lead sub-regions, the electrode sub-regions and the lead sub-regions are alternately arranged along the second direction, at least one electrode sub-region includes multiple touch electrodes sequentially arranged along the first direction, the at least one lead sub-region includes multiple sub-leads sequentially arranged along the second direction, and the multiple sub-leads are correspondingly connected with the multiple touch electrodes; and forming the at least two crack guide grooves in the deformation region includes: forming a protection layer covering the touch control structure, and forming the at least two crack guide grooves in the deformation region through a patterning process, at least one of the touch substrate, and the protection layer in the crack guide grooves is removed, or at least one of the touch substrate, the conductive layer and the protection layer in the crack guide grooves is removed.

In an exemplary embodiment, forming the self-capacitance touch module in the deformation region includes: forming a lead layer on the touch substrate, an insulating layer disposed on the lead layer and a conductive layer disposed on the insulating layer; the lead layer includes multiple sub-leads sequentially arranged along the second direction, the conductive layer includes multiple touch electrodes sequentially arranged along the first direction, and the multiple touch electrodes are correspondingly connected with the multiple sub-leads through vias; and forming at least two crack guide grooves in the deformation region includes: forming an protection layer covering the touch control structure, and forming at least two crack guide grooves in the deformation region through a patterning process, at least one of the touch substrate, the insulating layer and the protection layer in the crack guide grooves is removed, or at least one of the touch substrate, the insulating layer, the conductive layer and the protection layer in the crack guide grooves is removed.

Other aspects may be understood upon reading and understanding of the drawings and the detailed description.

BRIEF DESCRIPTION OF DRAWINGS

Accompanying drawings are used to provide an understanding of technical solutions of the present disclosure, form a part of the specification, and are used to explain the technical solutions of the present disclosure together with the embodiments of the present disclosure and not intended to form limitations on the technical solutions of the present disclosure. Shapes and sizes of one or more components in the drawings do not reflect actual scales, and are only intended to schematically describe contents of the present disclosure.

DESCRIPTION OF REFERENCE SIGNS

Figure 1:
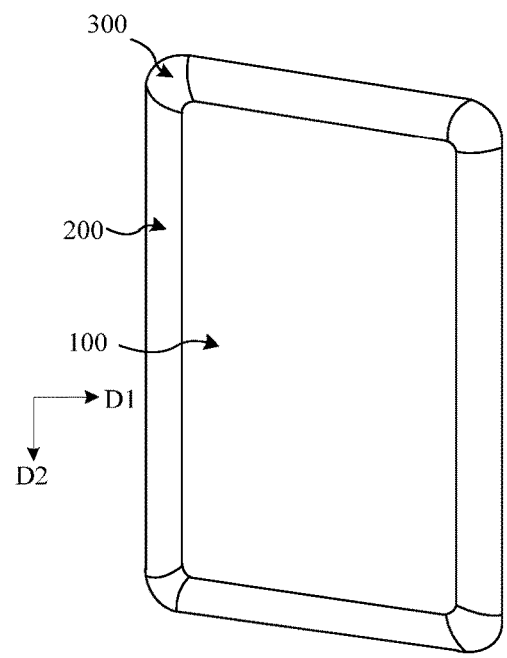
FIG. 1 is a schematic diagram of appearance of a display touch apparatus.

| | | |
|---|---|---|
| 10-display panel; | 20-touch panel; | 30-notch; |
| 100-flat region; | 101-substrate; | 102-drive structure layer; |
| 103-light-emitting structure layer; | 104-encapsulation structure layer | 110-first touch unit; |
| 111-first touch electrode; | 112-first connection part; | 120-second touch unit; |
| 121-second touch electrode; | 122-second connection part; | 131-touch electrode; |
| 200-bending region; | 201-buffer layer; | 202-first conductive layer; |
| 203-insulating layer; | 204-second conductive layer; | 205-protection layer; |
| 210-first bending region; | 220-second bending region; | 300-deformation region; |
| 310-first sub-region; | 320-second sub-region; | 330-central sub-region; |
| 401-first touch lead; | 402-second touch lead; | 410-first lead region; |
| 420-second lead region; | 430-central lead region; | 500-crack guide groove. |

DETAILED DESCRIPTION

The embodiments of the present disclosure will be described in detail below with reference to the drawings. It is to be noted that implementations may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other if there is no conflict.

In the drawings, a size of each constituent element, a thickness of a layer, or a region is exaggerated sometimes for clarity. Therefore, one implementation mode of the present disclosure is not necessarily limited to the size, and shapes and sizes of various components in the drawings do not reflect actual scales. In addition, the drawings schematically illustrate ideal examples, and one implementation mode of the present disclosure is not limited to the shapes, numerical values, or the like shown in the drawings.

Ordinal numerals such as "first", "second", "third", 1st, 2nd, and 3rd in the specification are not set to form limits in number but only to avoid confusion between constituent elements.

In the specification, for convenience, wordings indicating directional or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the constituent elements. Therefore, appropriate replacements may be made according to situations without being limited to the wordings described in the specification.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two components. Those of ordinary skills in the art may understand meanings of the above-mentioned terms in the present disclosure according to situations.

In the specification, a transistor refers to a component which at least includes three terminals, i.e., a gate electrode, a drain electrode and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be the drain electrode, and a second electrode may be the source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulating film" may be replaced with an "insulating layer" sometimes.

In the present disclosure, "about" refers to that a boundary is defined not so strictly and numerical values within process and measurement error ranges are allowed.

Capacitive On Cell touch panels usually adopt capacitive technology, including Mutual Capacitance structure and Self-capacitance structure. In a mutual capacitance structure, mutual capacitance is formed by a first touch electrode and a second touch electrode, and position detection is performed using changes in mutual capacitance. In a self-capacitance structure, self-capacitance is formed by a touch electrode and a human body, and position detection is performed using changes in self-capacitance. A self-capacitance touch panel has a single-layer structure, and has characteristics of low power consumption, and simple structure, etc. Structures of mutual capacitance touch panels may be divided into single-layer electrode structure and double-layer electrode structure. The single-layer electrode structure is featured in that a drive electrode and an induction electrode are arranged on a same layer, while the double-layer electrode structure is featured in that the drive electrode and induction electrode are arranged in different layers. In the single-layer electrode structure, a strip-shaped induction electrode crosses with a strip-shaped drive electrode, and each drive electrode produces coupling capacitance with a induction electrode to form a touch unit, and the single-layer electrode structure is also referred to as single-layer mutual capacitance structure. In the double-layer electrode structure, an induction electrode in one layer and a drive electrode in the other layer overlap each other to form a touch unit, and the double-layer electrode structure is also referred to as double-layer mutual capacitance structure.

A display touch apparatus of an exemplary embodiment of the present disclosure may include a display panel disposed on a substrate and a touch panel disposed on the display panel. The display panel may be a Liquid Crystal Display panel (LCD), an Organic Light Emitting Diode (OLED) display panel, a plasma display panel (PDP), or an Electrophoretic display (EPD) panel. In an exemplary embodiment, the display panel may be an OLED display panel. An OLED is an active light emitting display device that has advantages, such as self-luminescence, wide viewing angle, high contrast, low power consumption, and extremely high response speed. With constant development of display technologies, a Flexible Display, which uses OLED as a light emitting device and is signal-controlled by a Thin Film Transistor (TFT), has become a mainstream product in the display field.

In an exemplary embodiment, the display touch apparatus may have a Flexible Multi Layer On Cell (FMLOC for short) structure, in which a flexible touch panel is provided on an encapsulation structure layer of the OLED display panel to form an on-cell structure, thus a display structure and a touch control structure are integrated together. It has advantages such as lightness, thinness and foldability, and can meet needs of products such as flexible folding, narrow bending region and curved display.

With the development of display technology, especially flexible display technology, stereoscopic display products, such as hyperboloid display panels and quadrilateral display panels, have gradually come into being to provide better visual experience and meet needs of various application scenarios. Because the touch panel is disposed on the display panel, regardless whether the touch panel is disposed on or inside the display panel, the touch panel still needs to be provided as a curved surface suitable for the display panel. However, when the touch panel forms a curved surface through deformation, due to the ductility and stress of the material itself, cracks will easily appear in the deformation region, resulting in disconnection between electrodes and leads of the touch panel, thereby causing poor touch control.

FIG. 1 is a schematic diagram of appearance of a display touch apparatus. As shown in FIG. 1, in an exemplary embodiment, the display touch apparatus may include a flat region 100, a bending region 200 located on four sides of the flat region 100, and a deformation region 300 located at four corners of the flat region 100. In an exemplary embodiment, a flat region 100 may include a first edge (left edge) and a second edge (right edge) which are oppositely disposed in a first direction D1, and a third edge (upper edge) and a fourth edge (lower edge) which are oppositely disposed in a second direction D2, and adjacent edges are connected by arced chamfers, forming a quadrilateral shape with rounded chamfers. In an exemplary embodiment, the bending region 200 may include a first bending region (left bending region) and a second bending region (right bending region) oppositely disposed in the first direction D1, and a third bending region (upper bending region) and a fourth bending region (lower bending region) oppositely disposed in the second direction D2. In an exemplary embodiment, the deformation region 300 may include a first corner connecting the first bending region and the third bending region, a second corner connecting the second bending region and the third bending region, a third corner connecting the first bending region and the fourth bending region, and a fourth corner connecting the second bending region and the fourth bending region. In an exemplary embodiment, the four bending regions are two-dimensional surfaces formed by bending at corresponding edges, and the four deformation regions are three-dimensional surfaces formed by deformation at corresponding corners when the four bending regions are bent.

In an exemplary embodiment, the first edge and the second edge may be parallel to the second direction D2, and the third and fourth edges may be parallel to the first direction D1, wherein the first direction D1 and the second direction D2 intersect. In an exemplary embodiment, the first direction D1 may be an extension direction (horizontal row direction) of scan signal lines in a display panel, and the second direction D2 may be an extension direction (vertical column direction) of data signal lines in the display panel. The first direction D1 and the second direction D2 may be perpendicular to each other.

Figure 2:
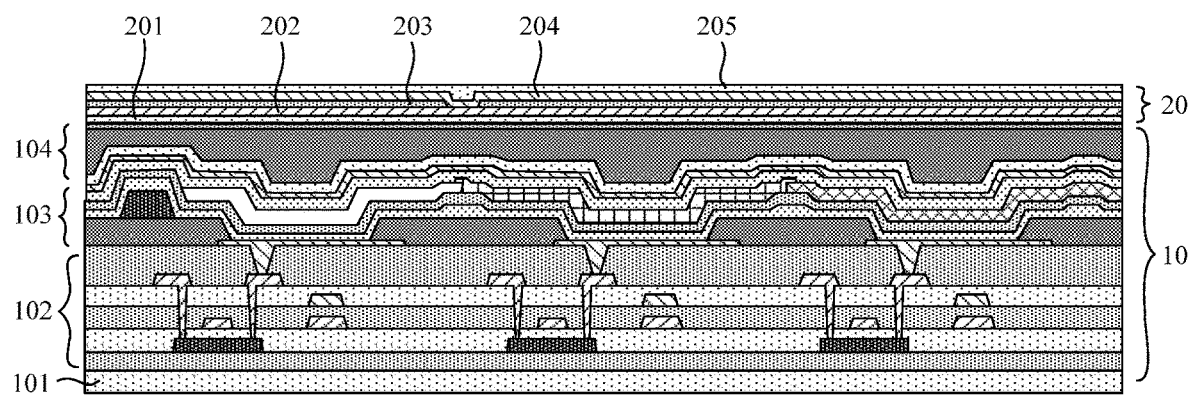
FIG. 2 illustrates a schematic view of a cross-sectional structure of a display touch apparatus.

FIG. 2 is a schematic diagram of a cross-sectional structure of a display touch apparatus, illustrating the structure of three sub-pixels in a flat region. As shown in FIG. 2, a touch panel 20 is disposed on a display panel 10. In an exemplary embodiment, on a plane perpendicular to the display panel, the display panel 10 may include a drive structure layer 102 disposed on the substrate 101, a light-emitting structure layer 103 disposed on a side of the drive structure layer 102 away from the substrate 101, and an encapsulation structure layer 104 disposed on the side of the light-emitting structure layer 103 away from the substrate 101. In some possible implementations, the display panel may include other film layers, such as a post spacer, which is not limited here in the present disclosure.

In an exemplary implementation, the substrate may be a flexible substrate, or may be a rigid substrate. The flexible base may include a first flexible material layer, a first inorganic material layer, a semiconductor layer, a second flexible material layer and a second inorganic material layer which are stacked. Materials of the first flexible material layer and the second flexible material layer may be polyimide (PI), polyethylene terephthalate (PET) or surface treated polymer soft films. Materials of the first inorganic material layer and the second inorganic material layer may be silicon nitride (SiNx) or silicon oxide (SiOx), for improving water and oxygen resistance of the substrate, and a material of the semiconductor layer may be amorphous silicon (a-si).

In an exemplary embodiment, the drive structure layer 102 of each sub-pixel may include multiple transistors and multiple storage capacitors forming a pixel drive circuit, an example of which is illustrated in FIG. 2 where each sub-pixel includes one transistor and one storage capacitor. In some possible implementations, the drive structure layer 102 of each sub-pixel may include: a first insulating layer disposed on the substrate, an active layer disposed on the first insulating layer, a second insulating layer covering the active layer; a gate electrode and a first capacitor electrode disposed on the second insulating layer, a third insulating layer covering the gate electrode and the first capacitor electrode, a second capacitor electrode disposed on the third insulating layer, a fourth insulating layer covering the second capacitor electrode, vias formed on the second insulating layer, the third insulating layer, and the fourth insulating layer which expose the active layer, a source electrode and a drain electrode disposed on the fourth insulating layer, which are respectively connected to the active layer through vias, and a planarization layer covering the aforementioned structures, wherein the planarization layer is provided with a via, and the via exposes the drain electrode. The active layer, the gate electrode, the source electrode and the drain electrode constitute the drive transistor, and the first capacitor electrode and the second capacitor electrode constitute the storage capacitor.

In an exemplary embodiment, a light-emitting structure layer 103 may include an anode, a pixel define layer, an organic light-emitting layer and a cathode. The anode is disposed on the planarization layer, and is connected to the drain electrode of the drive transistor through a via formed in the planarization layer. The pixel definition layer is disposed on the anode and the planarization layer, and a pixel opening is provided in the pixel definition layer and exposes the anode. The organic light emitting layer is at least partially disposed in the pixel opening, and is connected to the anode. The cathode is disposed on the organic light emitting layer, and is connected to the organic light emitting layer. The organic light emitting layer emits light of corresponding colors under driving of the anode and the cathode.

In an exemplary implementation, the encapsulation structure layer 104 may include a first encapsulation layer, a second encapsulation layer, and a third encapsulation layer that are stacked. The first encapsulation layer and the third encapsulation layer may be made of an inorganic material, and the second encapsulation layer may be made of an organic material. The second encapsulation layer is arranged between the first encapsulation layer and the third encapsulation layer, which may ensure that outside water vapor cannot enter the light light-emitting structure layer 103.

In an exemplary implementation, the light-emitting structure layer in the light-emitting structure layer may include an emitting layer (EML), and include one or more of a hole injection layer (HIL), a hole transport layer (HTL), a hole block layer (HBL), an electron block layer (EBL), an electron injection layer (EIL) and an electron transport layer (ETL). Under driving of voltages of the anode and the cathode, light is emitted according to a required gray scale using light emitting properties of the organic materials.

In an exemplary implementation, light emitting layers of OLEDs of different colors are different. For example, a red light emitting element includes a red emitting layer, a green light emitting element includes a green emitting layer, and a blue light emitting element includes a blue emitting layer. In order to reduce a process difficulty and improve a yield, a hole injection layer and a hole transport layer located on a side of an emitting layer may be a common layer, and an electron injection layer and an electron transport layer located on the other side of the emitting layer may be a common layer. In an exemplary embodiment, any one or more of the hole injection layer, the hole transport layer, the electron injection layer, and the electron transport layer may be prepared by one process (one evaporation process or one ink-jet printing process), while isolation is achieved by surface segment difference or surface treatment of the formed film layers, etc. For example, any one or more of a hole injection layer, a hole transport layer, an electron injection layer, and an electron transport layer corresponding to adjacent sub-pixels may be isolated. In an exemplary implementation, the organic emitting layer may be formed by evaporation using a fine metal mask (FMM) or an open mask, or formed using an inkjet process.

In an exemplary embodiment, on a plane perpendicular to the touch panel, the touch panel may include a buffer layer 201 disposed on a side of the encapsulation structure layer 104 away from the substrate 101, a first conductive layer 202 disposed on a side of the buffer layer 201 away from the substrate 101, an insulating layer 203 disposed on a side of the first conductive layer 202 away from the substrate 101, a second conductive layer 204 disposed on a side of the insulating layer 203 away from the substrate 101, a protection layer 205 disposed on a side of the second conductive layer 204 away from the substrate 101.

In an exemplary implementation, the buffer layer and the insulating layer may be made of any one or more of silicon oxide (SiOx), silicon nitride (SiNx), and silicon oxynitride (SiON), and may be in a single layer, multiple layers or a composite layer. The protection layer may be made of an organic material. In an exemplary embodiment, the first conductive layer and the second conductive layer may be metal mesh layers, which may be made of a metal material such as any one or more of silver (Ag), copper (Cu), aluminum (Al), titanium (Ti) and molybdenum (Mo), or an alloy material of the above metals. In another exemplary embodiment, the first conductive layer and the second conductive layer may be transparent electrode layers, and the transparent electrode layer may be indium tin oxide (ITO) or indium zinc oxide (IZO).

In an exemplary embodiment, the first conductive layer may be referred to as a bridge layer, and the second conductive layer may be referred to as a touch layer. The multiple first touch electrodes, the second touch electrodes and the first connection parts may be arranged on a same layer on the touch layer, connection bridges may be arranged on the bridge layer, and the connection bridges connect adjacent second touch electrodes to each other through vias.

In an exemplary embodiment, the touch panel may be attached to the display panel in a face-to-face coating manner with optically transparent resin (OCR) or optical adhesive (OCA) over the entire surface, or in a frame-to-frame coating manner with frame-to-frame adhesive around the edges, which is not limited in the present disclosure.

In an exemplary embodiment, the display touch apparatus may be any product or component with a display function such as a mobile phone, a tablet computer, a television, a display, a laptop computer, a digital photo frame, a navigator, etc.

Figure 3:
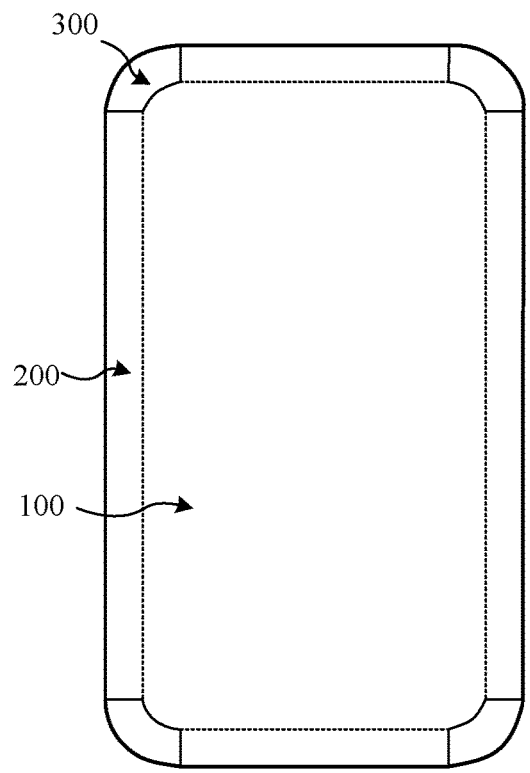
FIG. 3 is a schematic diagram of a touch panel in a planar unfolded state.

FIG. 3 is a schematic diagram of a touch panel in a planar unfolded state. The touch panel is configured to be disposed on a display panel to form an FMLOC structure. As shown in FIG. 3, in the exemplary embodiment, the touch panel includes a flat region 100, a bending region 200 located at four sides of the flat region 100 and a deformation region 300 located at four corners of the flat region 100. The flat region 100, the bending region 200 and the deformation region 300 are all provided with touch electrodes, forming a main touch region in the flat region 100, a side touch region in the bending region 200 and a corner touch region in the deformation region 300. When the touch panel is disposed on the display panel, the flat region 100 is attached to an effective region (AA) of the display panel, the bending region 200 is bent and wraps a side surface of the display panel, and the deformation region 300 is bent and deformed and wraps the corners of the display panel.

Figure 4:
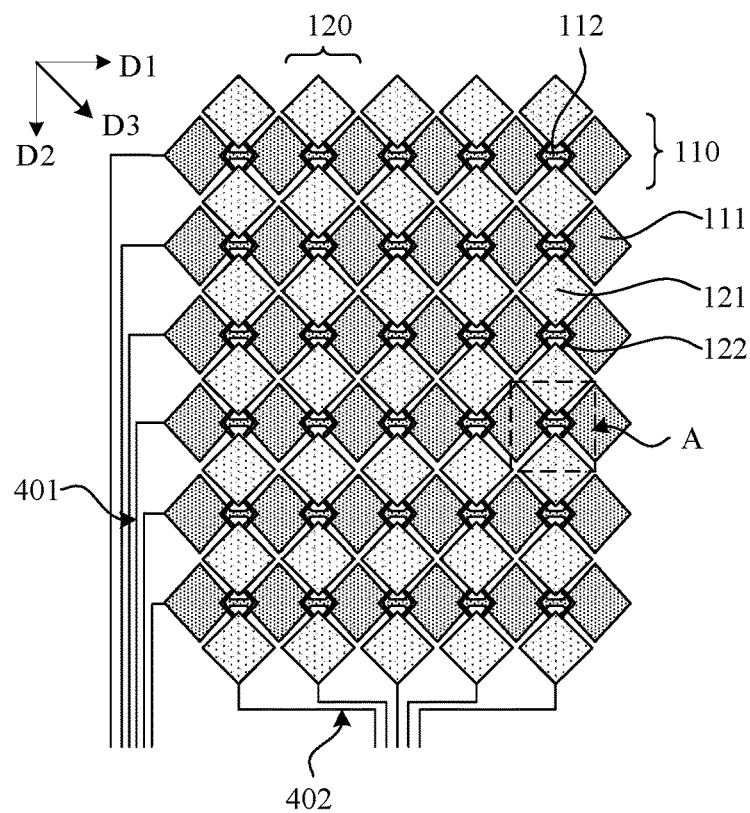
FIG. 4 is a schematic diagram of a structure of a touch electrode in a touch panel.

FIG. 4 is a schematic diagram of a structure of touch electrodes in a touch panel. In the exemplary embodiment, the flat region, the bending region and the deformation region of the touch panel may have a mutual capacitance structure. As shown in FIG. 4, The touch panel may include multiple first touch units 110 and multiple second touch units 120, wherein the first touch units 110 have a linear shape extending along a first direction D1 and the multiple first touch units 110 are disposed in sequence along a second direction D2. The second touch units 120 have a linear shape extending along the second direction D2 and the multiple second touch units 120 are disposed in sequence along the first direction D1, wherein the first direction D1 intersects with the second direction D2. Each first touch unit 110 includes multiple first touch electrodes 111 and first connection parts 112 which are disposed in sequence along the first direction D1, and the first touch electrodes 111 and the first connection part 112 are alternately disposed and sequentially connected. Each second touch unit 120 includes multiple second touch electrodes 121 disposed in sequence along the second direction D2, and the multiple second touch electrodes 121 are disposed at intervals, wherein adjacent second touch electrodes 121 are connected to each other by a second connection part 122. In an exemplary embodiment, a film layer where the second connecting parts 122 are located is different from a film layer where the first touch electrodes 111 and the second touch electrodes 121 are located. The first touch electrodes 111 and the second touch electrodes 121 are alternately arranged along a third direction D3, and the third direction D3 intersects with the first direction D1 and the second direction D2.

In an exemplary embodiment, the multiple first touch electrodes 111, the multiple second touch electrodes 121, and the multiple first connection parts 112 may be disposed on a same layer, i.e., the touch layer and may be formed by a same patterning process, and the first touch electrodes 111 and the first connection parts 112 may be connected to each other in an integrated structure. The second connection parts 122 serving as connection bridges may be disposed on a bridging layer, and adjacent second touch electrodes 121 are connected to each other through vias. An insulating layer is disposed between the touch layer and the bridging layer. In some possible implementations, the multiple first touch electrodes 111, the multiple second touch electrodes 121 and the multiple second connection parts 122 may be disposed on the same layer, i.e., the touch layer, wherein the second touch electrodes 121 and the second connection parts 122 may be connected to each other in an integrated structure. The first connection parts 112 may be disposed on the bridge layer and adjacent first touch electrodes 111 are connected to each other through vias. In an exemplary embodiment, the first touch electrodes may be driver (Tx) electrodes and the second touch electrodes may be sensor (Rx) electrodes. Or, the first touch electrodes may be sensor (Rx) electrodes and the second touch electrodes may be driver (Tx) electrodes.

In an exemplary embodiment, the bending region may include multiple touch leads, the first touch units 110 of each row are connected to at least one first touch lead 401, and the second touch units 120 of each column are connected to at least one second touch lead 402. In an exemplary embodiment, the first touch lead 401 and the second touch lead 402 are led out to a bonding region on one side of the touch region and connected to a touch chip through a flexible circuit board.

In an exemplary embodiment, the first touch electrodes 111 and the second touch electrodes 121 may have rhombic shapes, such as regular rhombic shapes, horizontally longer rhombic shapes, or vertically longer rhombic shapes. In some possible embodiments, the first touch electrodes 111 and the second touch electrodes 121 may have any one or more of shapes of triangles, squares, trapezoids, parallelograms, pentagons, hexagons, and other polygons, which are not limited in the present disclosure.

In an exemplary embodiment, the first touch electrodes 111 and the second touch electrodes 121 may be in a form of transparent conductive electrodes. In another exemplary embodiment, the first touch electrodes 111 and the second touch electrodes 121 may be in a form of metal meshes. The metal mesh is formed by multiple interweaving metal wires and includes multiple mesh patterns, wherein the mesh patterns are polygons formed by the multiple metal wires. The first touch electrodes and the second touch electrodes in the form of the metal mesh have advantages of small resistance, small thickness, fast response speed, and the like. In an exemplary embodiment, a mesh pattern surrounded by the metal wires may have a regular shape or an irregular shape, the edges of the mesh pattern may be straight lines or curve lines, and a line width of the metal wires may be less than or equal to 5 μm, which is not limited here in the embodiments of the present disclosure.

Figure 5:
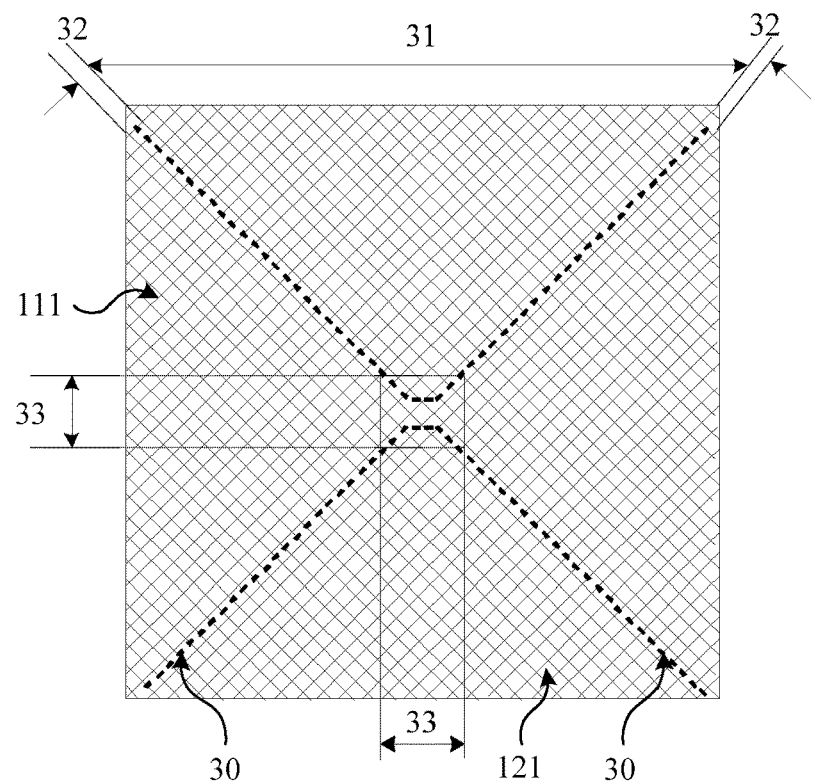
FIG. 5 is a schematic diagram of a structure of a touch electrode in a form of a metal mesh.

FIG. 5 is a schematic diagram of a structure of touch electrodes in a form of metal meshes and is an enlarged view of region A in FIG. 4. As shown in FIG. 5, the mesh patterns surrounded by metal wires have a rhombic shape. In order to insulate the first touch electrodes 111 from the second touch electrodes 121, the metal mesh is provided with multiple notches 30, and the multiple notches 30 disconnect the metal wires of the mesh patterns, thus implementing the isolation of the mesh patterns of the first touch electrodes 111 from the mesh patterns of the second touch electrodes 121. In FIG. 5, a black block is used for representing a notch 30, and the notch 30 may be understood as an imaginary line for cutting a metal wire.

In an exemplary embodiment, the multiple notches 30 constitute a bulk region (touch electrode region) 31 of the metal mesh, a boundary region 32 and a bridge region 33. Each mesh pattern located in the boundary region 32 is provided with a cut disconnecting the metal wires of mesh pattern, so that each mesh pattern is divided into two parts with one part belonging to the first touch electrodes 111 and the other part belonging to the second touch electrodes 121, or one part belonging to the second touch electrodes 121 and the other part belonging to the first touch electrodes 111. In an exemplary embodiment, the bridge region 33 includes a first connection part for connecting two first touch electrodes 111 and a second connection part for connecting two second touch electrodes 121. In an exemplary embodiment, the bridge region 33 is also provided with multiple notches which implement the isolation and connection of related mesh patterns.

Figure 6:
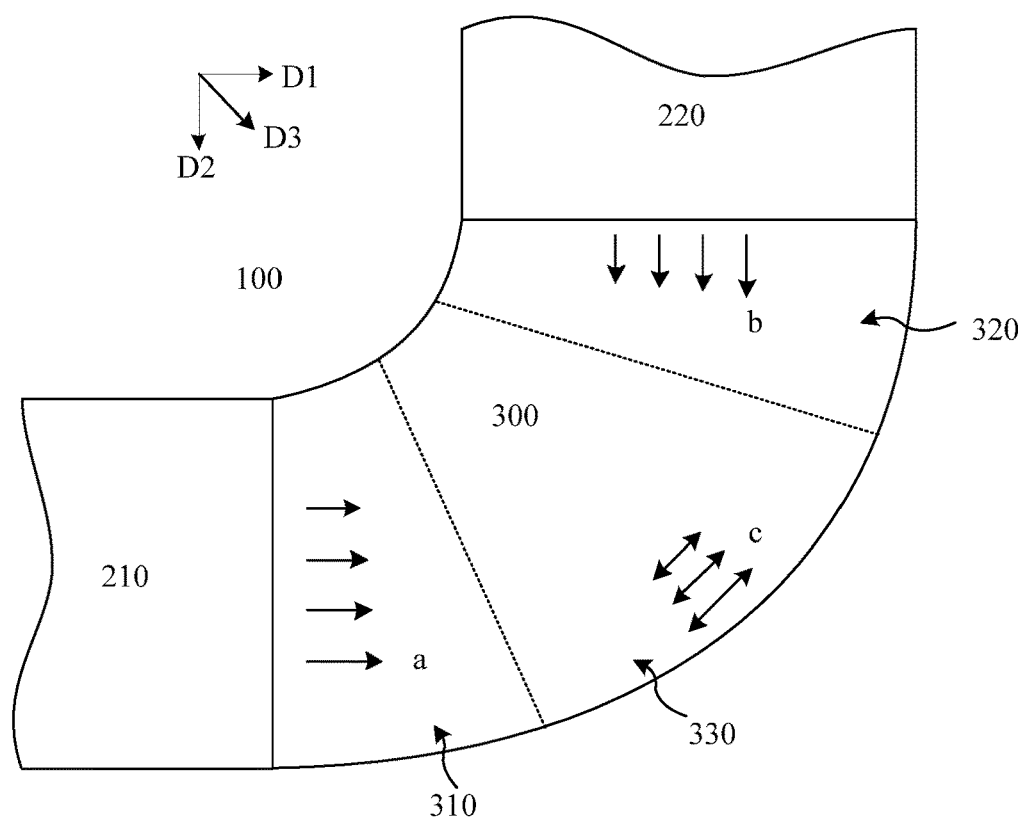
FIG. 6 is a schematic diagram of a deformation region in a touch panel.

FIG. 6 is a schematic diagram of a deformation region in a touch panel, which is an enlarged view on the lower right corner of FIG. 3. As shown in FIG. 6, the touch panel includes a first bending region 210 extending in a first direction D1 and a second bending region 220 extending in a second direction D2. The deformation region 300 is located between the first bending region 210 and the second bending region 220, and the deformation region may include at least a first sub-region 310 adjacent to the first bending region 210, a second sub-region 320 adjacent to the second bending region 220, and a central sub-region 330 located between the first sub-region 310 and the second sub-region 320.

When the first bending region 210 and the second bending region 220 are bent, the resulting deformation region 300 is subjected to stresses in different directions. During a bending process of the first sub-region 310 following the bending of the first bending region 210, the stress in the first sub-region 310 is mainly produced in direction a. During a bending process of the second sub-region 320 following the bending of second bending region 220, the stress in the second sub-region 320 is mainly produced in direction b. During a bending process of the central sub-region 330 following the bending of the first sub-region 310 and the second sub-region 320, the stress in the central sub-region 330 is mainly produced in direction c. In an exemplary embodiment, direction a is perpendicular to the first direction D1, direction b is perpendicular to the second direction D2, and direction c is perpendicular to the third direction D3, and the third direction D3 intersects with the first direction D1 and the second direction D2.

In an exemplary embodiment, the substrate (bearing layer) of the touch panel is mainly made of materials such as Polyimide (PI), Polyethylene terephthalate (PET) or Over Coat (OC). Due to poor ductility of the above materials, when a material with poor ductility is subjected to stresses in multiple directions and the stresses in multiple directions interact with each other, wrinkles or cracks appear in the deformation region 300, and the folds or cracks will cause the electrodes and leads of the deformation region 300 in the touch panel to be disconnected, resulting in poor touch control.

Figure 7:
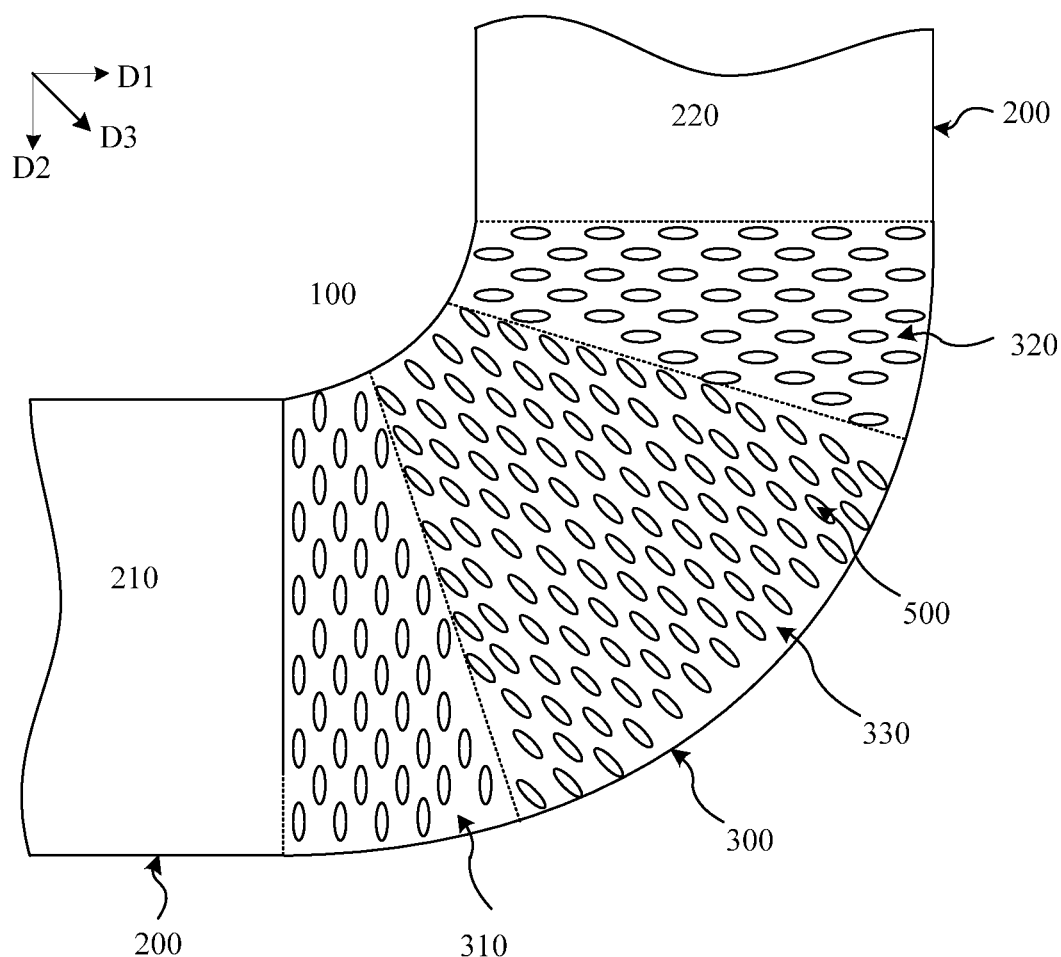
FIG. 7 is a schematic diagram of a planar structure of a deformation region according to an exemplary embodiment of the present disclosure.

FIG. 7 is a schematic diagram of a planar structure of a deformation region according to an exemplary embodiment of the present disclosure, illustrating a structure in which a crack guide groove is provided in the deformation region. As shown in FIG. 7, the touch panel may include a flat region 100, a bending region 200, and a deformation region 300. The bending region 200 may be located on four sides of the flat region 100 and may at least include two first bending regions 210 extending in the first direction D1 and two second bending regions 220 extending in the second direction D2. The deformation regions 300 may be located at four corners of the flat region 100 and one deformation region 300 is located between one first bending region 210 and one second bending region 220. The deformation region 300 may at least include a first sub-region 310 adjacent to the first bending region 210, a second sub-region 320 adjacent to the second bending region 220, and a central sub-region 330 located between the first sub-region 310 and the second sub-region 320. At least one crack guide groove 500 is provided in one or more of the first sub-region 310, the second sub-region 320 and the central sub-region 330. In an exemplary embodiment, the crack guiding groove 500 may be of a through-hole structure in which film layers are removed. In an exemplary embodiment, the crack guide groove 500 may be of a blind hole structure in which film layers are removed. In an exemplary embodiment, the crack guide groove is configured to control a direction of deformation of the deformation region during the bending, so as to avoid damages to the touch electrodes and leads in the deformation region.

In an exemplary embodiment, multiple crack guide grooves 500 are provided in each of the first sub-region 310, the second sub-region 320, and the central sub-region 330, and shapes of the crack guide grooves 500 in the three sub-regions may be the same. In an exemplary embodiment, a shape of a crack guide groove may be a circle, a square, a regular pentagon, a regular hexagon, or a regular polygon in a plane parallel to the touch panel.

In an exemplary embodiment, multiple crack guide grooves 500 are provided in each of the first sub-region 310, the second sub-region 320 and the central sub-region 330. On a plane parallel to the touch panel, the shape of each crack guide groove may include a strip shape extending in an extension direction, and the extension directions of the crack guide grooves 500 in the first sub-region 310, the second sub-region 320 and the central sub-region 330 intersect to adapt to a stress direction of a corresponding sub-region. In an exemplary embodiment, the shape of the crack guide groove may be elliptical, rectangular, trapezoidal, or polygonal.

In an exemplary embodiment, in a plane parallel to the touch panel, the shape of the crack guide grooves in the first sub-region 310 may be in a strip shape extending in a first extension direction, and the strip-shaped crack guide groove has a first length in the first extension direction. In a direction perpendicular to the first extension direction, the strip-shaped crack guide groove has a first width, wherein the first length is greater than the first width.

In some possible implementations, an included angle between the first extension direction and the first direction D1 may be about 75 degrees to 105 degrees. In some other possible implementations, the included angle between the first extension direction and the first direction D1 may be about 85 degrees to 99 degrees, such as 90 degrees. That is, the first extension direction is perpendicular to the first direction D1 and parallel to the second direction D2.

In some possible implementations, a ratio of the first length to the first width may be about 3 to 7. In some other possible implementations, the ratio of the first length to the first width may be about 4 to 6, e.g. 5.

In some possible implementations, the first length may be about 40 μm to 60 μm, and the first width may be about 8 μm to 12 μm. In some other possible implementations, the first length may be about 45 μm to 55 μm, and the first width may be about 9 μm to 11 μm. For example, the first length may be about 50 μm, and the first width may be about 10 μm.

In an exemplary embodiment, stresses in the first direction D1 are primarily produced during bending of the first sub-region 310 with the first bending region 210. According to the embodiment of the present disclosure, the crack guide grooves in the first sub-region 310 are provided to be strip-shaped, long axes of the strip-shaped crack guide grooves extend in a direction perpendicular (or nearly perpendicular) to the first direction D1, and short axes of the strip-shaped crack guide grooves are parallel (or nearly parallel) to the first direction D1, therefore stresses in the first direction D1 causes the crack guide grooves in the first sub-region 310 to deform mainly in a short axis direction. Because under a certain stress, the stresses acting in the short axis direction makes the crack guide grooves more easily deformed compared with the stresses acting in a long axis direction. This arrangement thus allows the crack guide grooves in the first sub-region 310 to control a direction of deformation when stressed, so that that crack guide grooves are preferentially deformed in the short axis direction. Deformation in the short axis direction can reduce stresses in regions apart from the crack guide grooves, reduce a probability of damages to the touch electrodes and leads, avoid wrinkles and cracks caused by poor material ductility in the deformation region to a maximum extent, effectively protect the touch electrodes and leads, ensure touch control effects and improve reliability.

In an exemplary embodiment, in a plane parallel to the touch panel, the shape of the crack guide grooves in the second sub-region 320 may be in a strip shape extending in a second extension direction, and in the second extension direction, a strip-shaped crack guide groove has a second length. In a direction perpendicular to the second extension direction, the strip-shaped crack guide groove has a second width, wherein the second length is greater than the second width.

In some possible implementations, an included angle between the second extension direction and the second direction D2 may be about 75 degrees to 105 degrees. In other possible implementations, the included angle between the second extension direction and the second direction D2 may be about 85 degrees to 99 degrees, such as 90 degrees. That is, the second extension direction is perpendicular to the second direction D2 and parallel to the first direction D1.

In some possible implementations, a ratio of the second length to the second width may be about 3 to 7. In some other possible implementations, the ratio of the second length to the second width may be about 4 to 6, e.g. 5.

In some possible implementations, the second length may be about 40 µm to 60 µm, and the second width may be about 8 µm to 12 µm. In some other possible implementations, the second length may be about 45 µm to 55 µm, and the second width may be about 9 µm to 11 µm. For example, the second length may be about 50 µm, and the second width may be about 10 µm.

In an exemplary embodiment, stresses in the second direction D2 are primarily produced during bending of the second sub-region 320 with the second bending region 220. According to the embodiment of the present disclosure, the crack guide grooves in the second sub-region 320 are provided to be strip-shaped, wherein long axes of the strip-shaped crack guide grooves extend in a direction perpendicular (or nearly perpendicular) to the second direction D2, and short axes of the strip-shaped crack guide grooves are parallel (or nearly parallel) to the second direction D2, the stress in the second direction D2 causes the crack guide groove in the second sub-region 320 to deform mainly in a short axis direction. Because under a certain stress, in a long axis direction, the stresses acting in the short axis direction makes the crack guide grooves more easily deformed compared with the stresses acting in the long axis direction. This arrangement thus allows the crack guide grooves in the second sub-region 320 to control a direction of deformation when stressed, so that that the crack guide grooves are preferentially deformed in the short axis direction. The deformation in the short axis direction can reduce stresses in regions apart from the crack guide grooves, reduce a probability of damages to the touch electrodes and leads, avoid wrinkles and cracks caused by poor material ductility in the deformation region to a maximum extent, effectively protect the touch electrodes and leads, ensure touch control effects and improve reliability.

In an exemplary embodiment, in a plane parallel to the touch panel, a shape of the crack guide grooves in the central sub-region 330 may be in a strip shape extending in a third extension direction, and in the third extension direction, a strip-shaped crack guide groove has a third length. In a direction perpendicular to the third extension direction, the strip-shaped crack guide groove has a third width, wherein the third length is greater than the third width.

In some possible implementations, the third extension direction may be the third direction D3. An included angle between the third extension direction and the first direction D1 may be about 30 degrees to 60 degrees. Or, the included angle between the third extension direction and the second direction D2 may be about 30 degrees to 60 degrees. In some other possible implementations, the included angle between the third extension direction and the first direction D1 may be about 40 degrees to 50 degrees, such as 45 degrees. Or, the included angle between the third extension direction and the second direction D2 may be about 40 degrees to 50 degrees, such as 45 degrees.

In some possible implementations, a ratio of the third length to the third width may be about 3 to 7. In some other possible implementations, the ratio of the third length to the third width may be about 4 to 6, e.g. 5.

In some possible implementations, the third length may be about 40 µm to 60 µm, and the third width may be about 8 µm to 12 µm. In some other possible implementations, the third length may be about 45 µm to 55 µm, and the third width may be about 9 µm to 11 µm. For example, the third length may be about 50 µm, and the third width may be about 10 µm.

In an exemplary embodiment, stresses perpendicular to the third direction D3 are primarily produced in the central sub-region 330 during bending of the first sub-region 310 and the second sub-region 320. According to the embodiment of the present disclosure, the crack guide grooves in the central sub-region 330 are provided to be strip-shaped, long axes of the strip-shaped crack guide grooves are parallel (or nearly parallel) to the third direction D3, and short axes of the strip-shaped crack guide grooves are perpendicular (or nearly perpendicular) to the third direction D3, therefore stresses perpendicular to the third direction D3 causes the crack guide grooves in the central sub-region 330 to deform mainly in the short axis direction. Because under a certain stress, compared with the stresses acting in the long axis direction, the stresses acting in the short axis direction makes the crack guide groove more easily deformed, this arrangement thus allows the crack guide grooves in the central sub-region 330 to control a direction of deformation when stressed, so that that crack guide grooves are preferentially deformed in the short axis direction. The deformation in the short axis direction can reduce the stresses in the region apart from the crack guide grooves, reduce the probability of damage touch electrodes and leads, avoid wrinkles and cracks caused by poor material ductility in the deformation region to a maximum extent, effectively protect the touch electrodes and leads, ensure touch control effects and improve reliability.

In an exemplary embodiment, the number of the crack guide grooves in the three sub-regions may be the same or may be different. The shapes of the crack guide grooves in the three sub-regions may be the same or different. The dimensions of the crack guide grooves in the three sub-regions may be the same or different. In a sub-region, long axis directions of multiple crack guide grooves may be the same or different. In a sub-region, shapes of multiple crack guide grooves may be the same or different. In a sub-region, dimensions of multiple crack guide grooves may be the same or different, and may be set according to actual needs, which is not limited here in the present disclosure.

In an exemplary embodiment, an overall direction of the long axes of the crack guide grooves in the deformation region may be set according to a base point of the deformation region. For example, the deformation region may be normalized into a ring segment, wherein a center of the ring is a geometric center of the ring segment, and the geometric center is taken as the base point. A long axis direction of at least one crack guide groove in the deformation region is a ray direction passing the geometric center, and multiple crack guide grooves are uniformly distributed according to the geometric center.

In an exemplary embodiment, an overall direction of the long axes of the crack guide grooves in the deformation region may be set according to an acute edge of the deformation region. For example, the deformation region may include an inner arc edge close to the flat region and an outer arc edge away from the flat region. An extension direction of at least one crack guide groove is substantially perpendicular to the inner arc edge of the deformation region (e.g. 80-100 degrees), or the extension direction of the at least one crack guide groove is substantially perpendicular to the outer arc edge of the deformation region (e.g. 80-100 degrees).

In an exemplary embodiment, the overall direction of the long axes of the crack guide grooves in the deformation region may be set in a gradient manner. For example, in a direction from the first sub-region to the central sub-region, and in a direction from the central sub-region to the second sub-region, the extension directions of the crack guide grooves gradually change.

Figure 8:
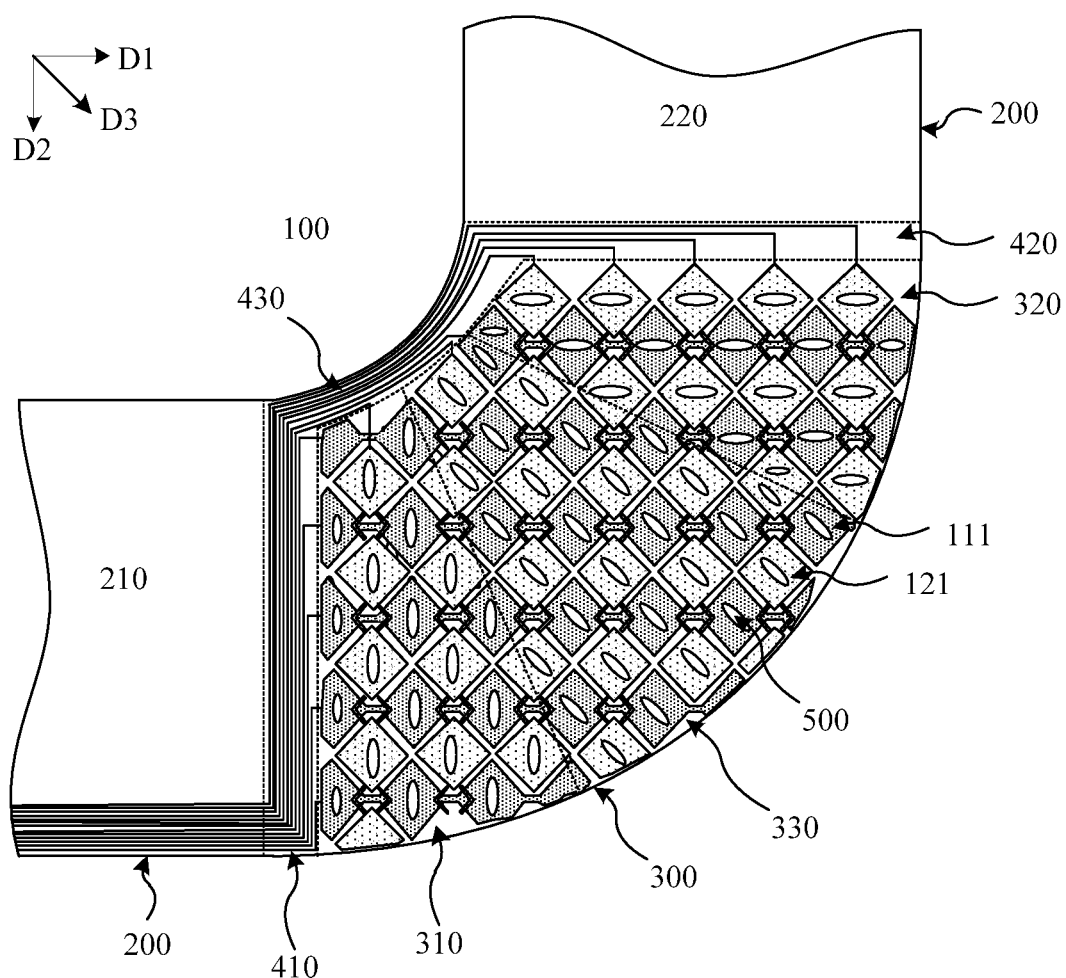
FIG. 8 is a schematic diagram of a planar structure of another deformation region according to an exemplary embodiment of the present disclosure.

FIG. 8 is a schematic diagram of a planar structure of another deformation region according to an exemplary embodiment of the present disclosure, illustrating a structure in which touch electrodes and crack guide grooves are provided in the deformation region. As shown in FIG. 8, in an exemplary embodiment, the deformation region 300 may at least include an electrode region and a lead region. In an exemplary embodiment, the lead region may at least include a first lead region 410 between the electrode region and the first bending region 210, a second lead region 420 between the electrode region and the second bending region 220, and a central lead region 430 between the electrode region and the flat region 100. In an exemplary embodiment, the electrode region may at least include a first sub-region 310 adjacent to the first bending region 210 (first lead region 410), a second sub-region 320 adjacent to the second bending region 220 (second lead region 420), and a central sub-region 330 located between the first sub-region 310, the second sub-region 320, and the central lead region 430. In an exemplary embodiment, the electrode region including the first sub-region 310, the second sub-region 320, and the central sub-region 330 is provided with multiple touch electrodes and multiple crack guide grooves.

In an exemplary embodiment, touch modules arranged in the electrode regions of the display region 100, the first bending region 210, the second bending region 220 and the deformation region 300 are all in mutual capacitance single-layer electrode structures. Drive electrodes and induction electrodes are provided on a same layer. Only the touch electrodes of the electrode region of the deformation region 300 are illustrated in FIG. 8, but the touch electrodes of the display region 100, the first bending region 210 and the second bending region 220 are not shown. In an exemplary embodiment, the touch electrodes may include multiple first touch electrodes 111 sequentially arranged in a first direction D1 and multiple second touch electrodes 121 sequentially arranged in a second direction D2. The multiple first touch electrodes 111 are arranged at intervals and connected to each other through first connection parts, and the multiple second touch electrodes 121 are arranged at intervals and connected to each other through second connection parts, so that the multiple first touch electrodes 111 and the multiple second touch electrodes 121 are alternately arranged in a third direction D3. In an exemplary embodiment, the first connection parts are disposed on a same layer as the first touch electrodes and the second touch electrodes, and the film layer where the second connection parts are located is different from the film layer where the first touch electrodes and the second touch electrodes are located.

In an exemplary embodiment, the first lead region 410 may include multiple first touch leads, wherein first terminals of the multiple first touch leads are respectively connected to the first touch electrodes 111 of each row, and second terminals of the multiple first touch leads are introduced into the first bending region 210 after extending in the second direction D2.

In an exemplary embodiment, the second lead region 420 may include multiple second touch leads, wherein first terminals of the multiple second touch leads are respectively connected to the second touch electrodes 121 of each column, second terminals of the multiple second touch leads extend from the second lead region 420 to the first lead region 410 via the central lead region 430 and are introduced into the first bending region 210.

In an exemplary embodiment, the central lead region 430 may include multiple first touch leads and multiple second touch leads. The first touch leads are connected to first touch electrodes 111 of corresponding rows, the second touch leads are connected to second touch electrodes 121 of corresponding columns, and the second terminals of the multiple first touch leads and the multiple second touch leads extend from the central lead region 430 to the first lead region 410 and are introduced into the first bending region 210.

In an exemplary embodiment, the first touch electrodes and the second touch electrodes may be in a form of transparent conductive electrodes or may be in a form of metal meshes, which is not limited here in the present disclosure.

In an exemplary embodiment, the first sub-region 310, the second sub-region 320 and the central sub-region 330 in the electrode region are each provided with multiple crack guide grooves 500. At least one crack guide groove 500 is provided in a region defined by a contour of a first touch electrode 111. Alternatively, at least one crack guide groove 500 is provided in a region defined by a contour of a second touch electrode 121. Alternatively, at least one crack guide groove 500 is provided in a region defined by contours of a first touch electrode 111 and a second touch electrode 121. In an exemplary embodiment, an orthographic projection of the contour of the first touch electrode 111 and/or the contour of the second touch electrode 121 on a plane of the touch panel includes an orthographic projection of the crack guide groove 500 on the plane of the touch panel. In the exemplary embodiment of the present disclosure, the crack guide groove is provided in the region where the touch electrodes are located, which not only can avoid destroying the integrity of the contours of the touch electrodes and ensuring the touch precision and sensitivity, but also can prevent a through-hole structure of the crack guide groove from affecting the connection reliability of the connection parts between the touch electrodes and ensuring the touch control reliability.

In an exemplary embodiment, the touch electrodes in the deformation region may be smaller in size than the touch electrodes in the flat region. For example, dimensions of a first touch electrode and a second touch electrode in the flat region and a bending region may be about 4 mm*4 mm or 5 mm*5 mm, and dimensions of a first touch electrode and a second touch electrode in the deformation region may be about 3 mm*3 mm or 3.5 mm*3.5 mm. In an exemplary embodiment, a size of a crack guide groove in the deformation region may be about 10 μm*50 μm, and multiple crack guide grooves may be provided in a region defined by a contour of one touch electrode. In an exemplary embodiment, the number of crack guide grooves in the region where one touch electrode is located may be the same or may be different. In the region where one touch electrode is located, the shapes of multiple crack guide grooves may be the same or different, the dimensions of the multiple crack guide grooves may be the same or different, and may be set according to actual needs, which is not limited here in the present disclosure.

In an exemplary embodiment, in the first sub-region 310, the multiple crack guide grooves 500 may be in a strip shape extending in the second direction D2, that is, long axis directions of the crack guide grooves 500 are parallel to the second direction D2, and short axis directions of the crack guide grooves 500 are parallel to the first direction D1.

In an exemplary embodiment, in the second sub-region 320, the multiple crack guide grooves 500 may be in a strip shape extending in the first direction D1, i.e. long axis directions of the crack guide grooves 500 are parallel to the first direction D1, and short axis directions of the crack guide grooves 500 are parallel to the second direction D2.

In an exemplary embodiment, in the central sub-region 330, the multiple crack guide grooves 500 may be in a strip shape extending in the third direction D3, i.e. long axis directions of the crack guide grooves 500 are parallel to the third direction D3, and short axis directions of the crack guide grooves 500 are perpendicular to the third direction D3.

In an exemplary embodiment of the present disclosure, a first lead region and a second lead region of the deformation region are arranged between an electrode region of the deformation region and a bending region, so that lead structure and structure layout are simplified. By arranging the central lead region of the deformation region between the electrode region of the deformation region and the flat region, i.e. the central lead region is close to the flat region, stresses acted on the leads in the central lead region in a bending process are minimized, poor touch control caused by disconnection of the leads is avoided, and the touch control reliability is improved.

Figure 9:
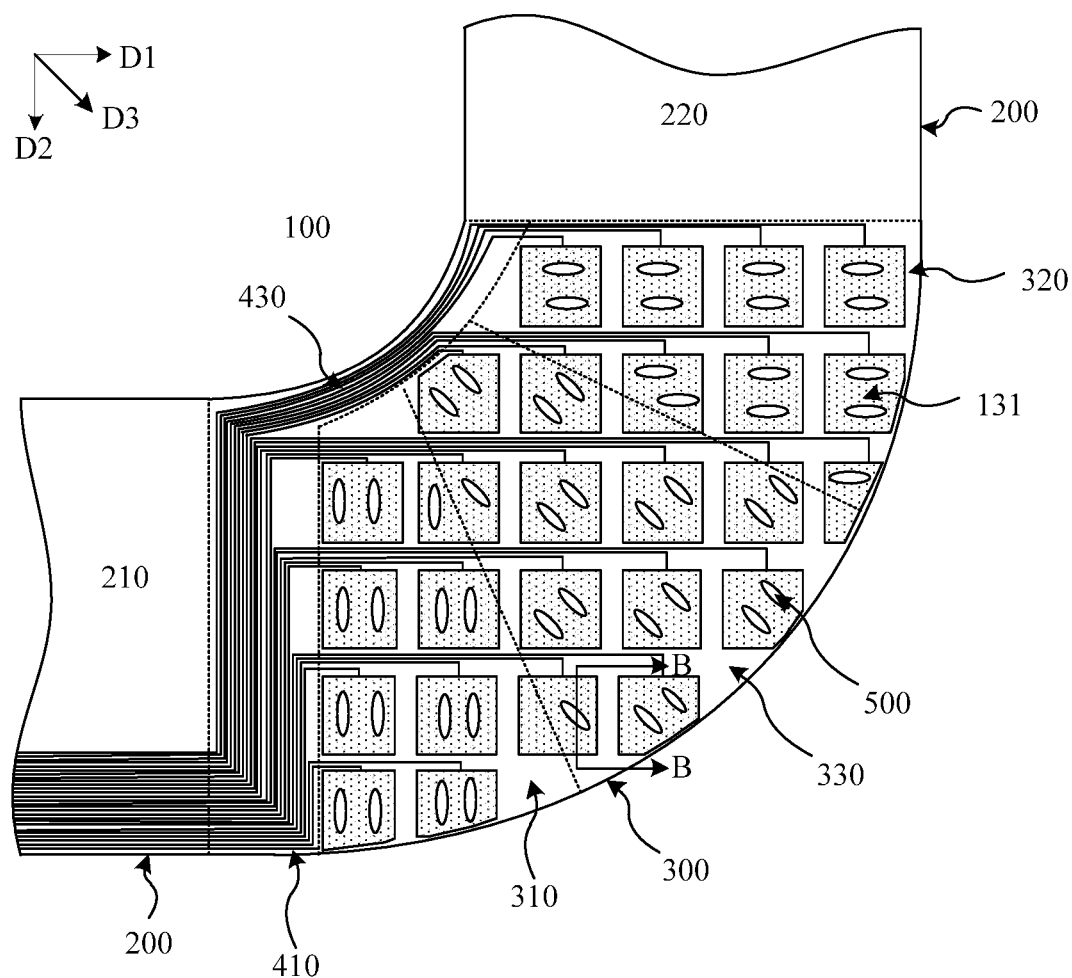
FIG. 9 is a schematic view of a planar structure of another deformation region according to an exemplary embodiment of the present disclosure.

FIG. 9 is a schematic view of a planar structure of another deformation region according to an exemplary embodiment of the present disclosure, illustrating a structure in which touch electrodes and crack guide grooves are provided in the deformation region. As shown in FIG. 9, in an exemplary embodiment, the deformation region 300 may at least include an electrode region and a lead region. In an exemplary embodiment, the lead region may at least include a first lead region 410 and a central lead region 430, wherein the first lead region 410 is located between the electrode region and the first bending region 210 and the central lead region 430 is located between the electrode region and the flat region 100. In an exemplary embodiment, the electrode region may at least include a first sub-region 310 adjacent to the first bending region 210 (first lead region 410), a second sub-region 320 adjacent to the second bending region 220, and a central sub-region 330 located between the first sub-region 310, the second sub-region 320, and the central lead region 430. In an exemplary embodiment, the electrode region including the first sub-region 310, the second sub-region 320, and the central sub-region 330 is provided with multiple touch electrodes and multiple crack guide grooves.

In an exemplary embodiment, touch modules provided in the flat region 100, the first bending region 210, and the second bending region 220 have a mutual capacitance structure, while the touch modules provided in the electrode region of the deformation region 300 have a self-capacitance structure. In FIG. 9, only the touch electrodes of the self-capacitance structure of the deformation region 300 are schematically illustrated, while the touch electrodes of the flat region 100, the first bending region 210, and the second bending region 220 are not shown. In an exemplary embodiment, the electrode region may include multiple electrode sub-regions and multiple lead sub-regions. The electrode sub-regions and the lead sub-regions are strip-shaped and extend in a first direction D1, and the strip-shaped electrode sub-regions and the strip-shaped lead sub-regions are alternately arranged in a second direction D2, i.e., one lead sub-region is arranged between the two electrode sub-regions and one electrode sub-region is arranged between the two lead sub-regions except for edge positions. At least one electrode sub-region includes multiple touch electrodes 131 arranged in sequence in the first direction D1. Each lead sub-region includes multiple sub-leads arranged in sequence along the second direction D2, wherein the multiple sub-leads are correspondingly connected to multiple touch electrodes 131. A first terminal of each sub-lead is connected to one touch electrode 131, and a second terminal of each sub-lead extends to the first lead region 410 or the central lead region 430 in a direction opposite to the first direction D1.

In an exemplary embodiment, the first lead region 410 may include multiple touch leads, wherein first terminals of the multiple touch leads are respectively correspondingly connected to multiple rows of sub-leads, and second terminals of the multiple touch leads are introduced into the first bending region 210 after extending along the second direction D2.

In an exemplary embodiment, the central lead region 430 may include multiple touch leads, wherein first terminals of the multiple touch leads are respectively connected corresponding to multiple rows of sub-leads, and second terminals of the multiple touch leads extend from the central lead region 430 to the first lead region 410 and are introduced into the first bending region 210.

In an exemplary embodiment, the first sub-region 310, the second sub-region 320, and the central sub-region 330 in the electrode region are each provided with multiple crack guide grooves 500, wherein each of the multiple crack guide grooves 500 is provided in a region defined by a contour of a touch electrode 131. In an exemplary embodiment, an orthographic projection of the contour of the touch electrode 131 on the plane of the touch panel includes an orthographic projection of the crack guide groove 500 on the plane of the touch panel. In the exemplary embodiment of the present disclosure, the crack guide grooves are provided in a region where the touch electrodes are located, which can prevent a through-hole structure of the crack guide grooves from affecting connection reliability of the leads and ensure the touch control reliability.

In an exemplary implementation, the touch electrodes 131 may be of a regular pattern of about 3 mm*3 mm or 3.5 mm*3.5 mm, which may be a rectangle, a rhombus, a triangle or a polygon. In an exemplary embodiment, corners of the rectangular rhombic triangular or polygonal patterns or the like may have an arc chamfered structure to avoid damages to the electrodes. Dimensions of a crack guide groove in the deformation region may be about 10 μm*50 μm, and multiple crack guide grooves may be provided in a region defined by a contour of one touch electrode. In an exemplary embodiment, the number of crack guide grooves in a region where one touch electrode is located may be the same or may be different. In the region where one touch electrode is located, the shapes of multiple crack guide grooves may be the same or different; the dimensions of the multiple crack guide grooves may be the same or different, and may be set according to actual needs, which is not limited here in the present disclosure.

In an exemplary embodiment, in the first sub-region 310, the multiple crack guide grooves 500 may be in a strip shape extending in the second direction D2, that is, long axis directions of the crack guide grooves 500 are parallel to the second direction D2, and short axis directions of the crack guide grooves 500 are parallel to the first direction D1.

In an exemplary embodiment, in the second sub-region 320, the multiple crack guide grooves 500 may be in a strip shape extending in the first direction D1, i.e. long axis directions of the crack guide grooves 500 are parallel to the first direction D1, and short axis directions of the crack guide grooves 500 are parallel to the second direction D2.

In an exemplary embodiment, in the central sub-region 330, the multiple crack guide grooves 500 may be in a strip shape extending in the third direction D3, i.e. long axis directions of the crack guide grooves 500 are parallel to the third direction D3, and short axis directions of the crack guide grooves 500 are perpendicular to the third direction D3.

In an exemplary embodiment, the touch electrodes of the deformation region include a complete touch electrode having a complete contour and a cut touch electrode having an incomplete contour, wherein the cut touch electrode is a touch electrode cut for adapting to the shape of the deformation region. In an exemplary embodiment, a ratio of an area of the cut touch electrode to an area of the complete touch electrode is set to be greater than or equal to 0.5 to ensure touch performance at the edge.

In an exemplary embodiment, the touch electrodes may be in a form of transparent conductive electrodes or may be in a form of metal meshes, which are not limited here in the present disclosure.

In an exemplary embodiment, the flat region, the bending region, and the deformation region may be each provided with a mutual capacitance touch module. Alternatively, the flat region, the bending region and the deformation region may be each provided with a self-capacitance touch module. Alternatively, the flat region may be provided with a mutual capacitance touch module, and the bending region and the deformation region may be provided with a self-capacitance touch module. Alternatively, the flat region and the bending region may be provided with a mutual capacitance touch module, and the deformation region is provided with a self-capacitance touch module, which is not limited here in the present disclosure.

In the exemplary embodiment of the present disclosure, the touch control structure of the deformation region is provided as a self-capacitance structure, since the self-capacitance structure is a single-layer electrode structure, and an integral strength of the whole electrode structure to deal with stresses is higher, damages to the touch electrode can be effectively avoided, the deformation of the crack guide grooves has less influence on the performance of the self-capacitance, and the overall reliability is improved. The first lead region is arranged between the electrode region of the deformation region and the bending region, so that the lead structure and structural layout are simplified. By arranging the central lead region of the deformation region between the touch region of the deformation region and the flat region, stresses acted on the leads in the central lead region during bending is minimized, the poor touch control caused by disconnection of the leads is avoided, and the touch control reliability is improved.

Figure 10:
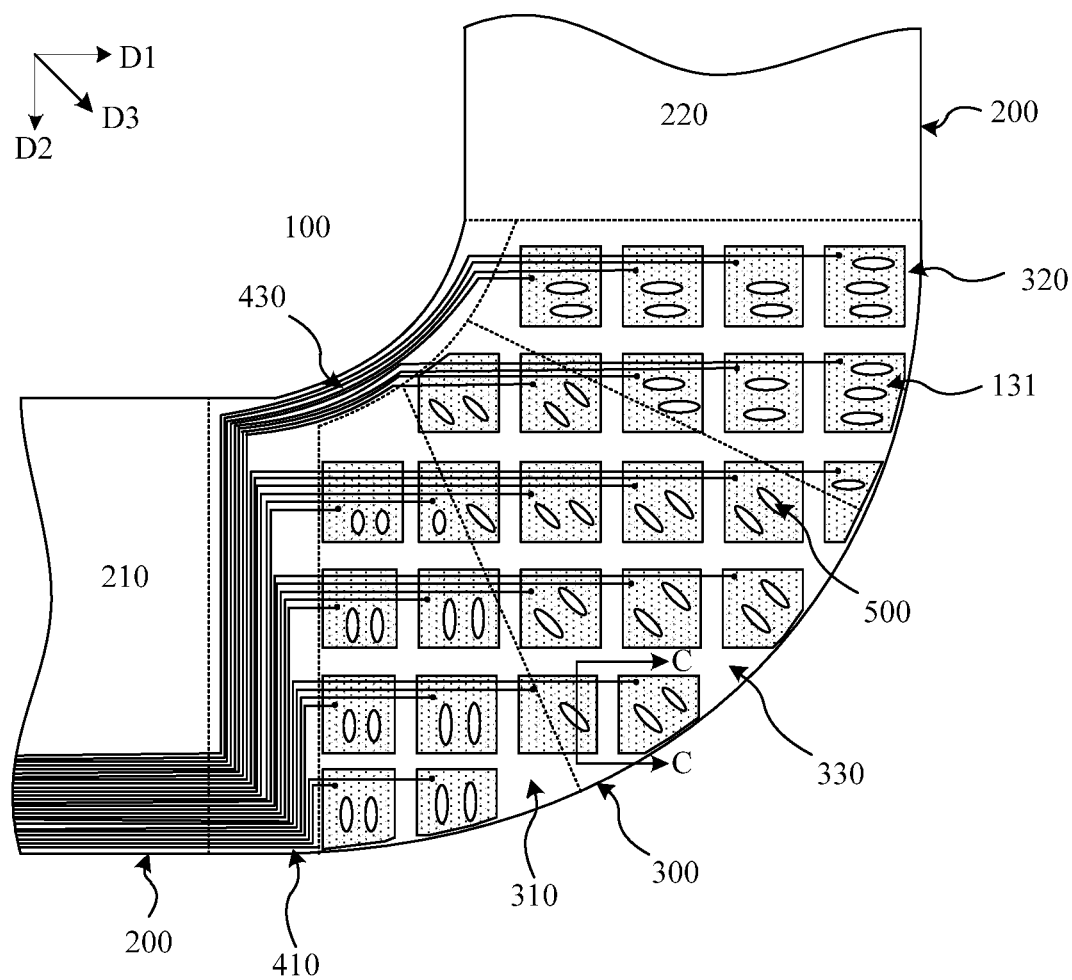
FIG. 10 is another schematic diagram of a planar structure of another deformation region according to an exemplary embodiment of the present disclosure.

FIG. 10 is a schematic view of a planar structure of another deformation region according to an exemplary embodiment of the present disclosure, illustrating a structure in which touch electrodes and crack guide grooves are provided in the deformation region. Electrode structures in the present exemplary embodiment are similar to those in the embodiment shown in FIG. 9 except that the sub-leads are located above or below the touch electrodes. As shown in FIG. 10, in an exemplary embodiment, touch modules provided in the flat region 100, the first bending region 210, and the second bending region 220 have a mutual capacitance structure, while the touch modules provided in the electrode region of the deformation region 300 have a self-capacitance structure. In FIG. 10, only the touch electrodes in the self-capacitance structure of the deformation region 300 are schematically illustrated, while the touch electrodes of the flat region 100, the first bending region 210, and the second bending region 220 are not shown. In an exemplary embodiment, the electrode region may include multiple composite electrode sub-regions having a strip shape extending in a first direction D1. The multiple composite electrode sub-regions are sequentially arranged in a second direction D2, and a strip-shaped composite electrode sub-region includes multiple touch electrodes 131 sequentially disposed in the first direction D1 and multiple sub-leads sequentially disposed in the second direction D2. A first terminal of each sub-lead is connected to one touch electrode 131, and a second terminal of each sub-lead extends to the first lead region 410 or the central lead region 430 in a direction opposite to the first direction D1. The sub-lead is located above or below the touch electrode 131, that is, an orthographic projection of the touch electrode 131 on the plane of the touch panel includes an orthographic projection of the sub-lead on the plane of the touch panel. In an exemplary embodiment, the touch electrodes 131 may be disposed in a touch layer, the sub-leads may be disposed in a lead layer, an insulating layer is disposed between the touch layer and the lead layer, and the sub-leads may be connected to corresponding touch electrodes 131 through electrode vias formed in the insulating layer.

In an exemplary embodiment, the first lead region 410 may include multiple touch leads, wherein first terminals of the multiple touch leads are respectively connected to multiple rows of sub-leads correspondingly, and second terminals of the multiple touch leads are introduced into the first bending region 210 after extending along the second direction D2. The central lead region 430 may include multiple touch leads, wherein first terminals of the multiple touch leads are respectively connected to multiple rows of sub-leads correspondingly, and second terminals of the multiple touch leads extend from the central lead region 430 to the first lead region 410 and are introduced to the first bending region 210.

In an exemplary embodiment, the touch electrodes may be in a form of transparent conductive electrodes or may be in a form of metal meshes, which are not limited here in the present disclosure.

In an exemplary embodiment, the first sub-region 310, the second sub-region 320, and the central sub-region 330 in the electrode region are each provided with multiple crack guide grooves 500, wherein each of the multiple crack guide grooves 500 is provided in a region defined by a contour of a touch electrode 131 and in a region outside the region where the sub-leads and electrode vias are located. In an exemplary embodiment, an orthographic projection of the contour of the touch electrode 131 on the plane of the touch panel includes an orthographic projection of the crack guide groove on the plane of the touch panel, and there is no overlapping region between the orthographic projection of the crack guide groove on the plane of the touch panel and the orthographic projection of the sub-leads and the electrode vias on the plane of the touch panel.

In an exemplary implementation, the touch electrodes 131 may be of a regular pattern of about 3 mm*3 mm or 3.5 mm*3.5 mm, which may be a rectangle, a rhombus, a triangle or a polygon. Dimension of a crack guide groove in the deformation region may be about 10 μm*50 μm, and multiple crack guide grooves may be provided in a region defined by a contour of one touch electrode. In an exemplary embodiment, the number of crack guide grooves in a region where one touch electrode is located may be the same or may be different. In the region where one touch electrode is located, the shapes of multiple crack guide grooves may be the same or different, the dimensions of the multiple crack guide grooves may be the same or different, and may be set according to actual needs, which are not limited here in the present disclosure.

In an exemplary embodiment, in the first sub-region 310, the multiple crack guide grooves 500 may be in a strip shape extending in the second direction D2. In the second sub-region 320, the multiple crack guide grooves 500 may be in a strip shape extending in the first direction D1. In the central sub-region 330, the multiple crack guide grooves 500 may be in a strip shape extending in the third direction D3.

Figure 11:
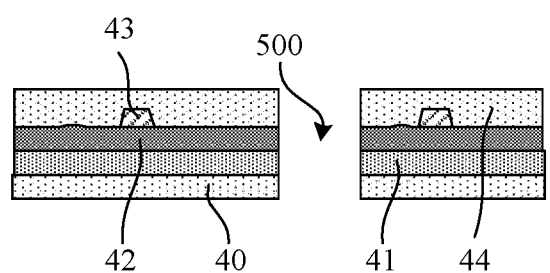
FIG. 11 is a schematic diagram of a cross-sectional structure of a deformation region according to an exemplary embodiment of the present disclosure.

FIG. 11 is a schematic diagram of a cross-sectional structure of a deformation region according to an exemplary embodiment of the present disclosure, and it is a sectional view taken along B-B in FIG. 9. As shown in FIG. 11, on a plane perpendicular to the touch panel, the deformation region may include a touch substrate 40, a first insulating layer 41 disposed on the touch substrate 40, a second insulating layer 42 disposed on a side of the first insulating layer 41 away from the touch substrate 40, a metal mesh layer 43 disposed on a side of the second insulating layer 42 away from the touch substrate 40, and a protection layer 44 disposed on a side of the metal mesh layer 43 away from the touch substrate 40. In an exemplary embodiment, the touch substrate 40 may be made of polyimide (PI), polyethylene terephthalate (PET), over coat (OC) or the like. The first insulating layer 41 and the second insulating layer 42 may be made of silicon oxide, silicon nitride, silicon oxynitride, or the like. The metal mesh layer 43 may be made of a metal material such as any one or more of silver (Ag), copper (Cu), aluminum (Al), titanium (Ti), and molybdenum (Mo), or an alloy material of the above metals. The protection layer 44 may be made of a resin material, or the like. The metal mesh layer 43 may include multiple metal wires interwoven to form multiple metal meshes. The multiple metal meshes form touch electrodes and sub-leads through multiple notches. In an exemplary embodiment, the deformation region does not have to be provided with the first insulating layer.

In an exemplary embodiment, the deformation region may include multiple crack guide grooves 500, and the touch substrate 40, the first insulating layer 41, the second insulating layer 42, and the protection layer 44 in the crack guide grooves 500 are removed to form a through-hole structure. In an exemplary embodiment, one or more of the touch substrate 40, the first insulating layer 41, the second insulating layer 42, and the protection layer 44 in the crack guide groove 500 are removed to form a blind hole structure.

In an exemplary embodiment, on a plane parallel to the touch panel, a metal mesh formed by interweaving metal wires has a size of about 60 μm*60 μm, and a crack guide groove has a size of about 10 μm*50 μm. One or more crack guide grooves may be provided in a region defined by one metal mesh.

Figure 12:
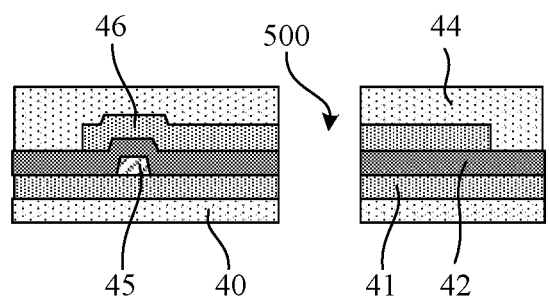
FIG. 12 is a schematic diagram of a cross-sectional structure of another deformation region according to an exemplary embodiment of the present disclosure.

FIG. 12 is a schematic diagram of a cross-sectional structure of another deformation region according to an exemplary embodiment of the present disclosure, and it is a sectional view taken along C-C in FIG. 10. As shown in FIG. 12, on a plane perpendicular to the touch panel, the deformation region may include: a touch substrate 40, a first insulating layer 41 disposed on the touch substrate 40, a lead layer 45 disposed on a side of the first insulating layer 41 away from the touch substrate 40, a second insulating layer 42 disposed on a side of the lead layer 45 away from the touch substrate 40, a transparent conductive layer 46 disposed on a side of the second insulating layer 42 away from the touch substrate 40, and a protection layer 44 disposed on a side of the transparent conductive layer 46 away from the touch substrate 40. In an exemplary embodiment, the lead layer 45 may be made of a metal material, and the transparent conductive layer 46 may be made of a transparent conductive material, such as indium tin oxide (ITO) or indium zinc oxide (IZO). The lead layer 45 may include multiple sub-leads, and the transparent conductive layer 46 may include multiple touch electrodes connected to corresponding sub-leads through electrode vias formed on the second insulating layer. In an exemplary embodiment, the deformation region does not have to be provided with the first insulating layer.

In an exemplary embodiment, the deformation region may include multiple crack guide grooves 500, and the touch substrate 40, the first insulating layer 41, the second insulating layer 42, the transparent conductive layer 46, and the protection layer 44 in the multiple crack guide grooves 500 are removed to form a through-hole structure. In an exemplary embodiment, one or more of the touch substrate 40, the first insulating layer 41, the second insulating layer 42, the transparent conductive layer 46, and the protection layer 44 in the crack guide grooves 500 are removed to form a blind hole structure.

The following is an exemplary description through a manufacturing process of the touch panel. A "patterning process" mentioned in the present disclosure includes coating with a photoresist, mask exposure, development, etching, photoresist stripping, and other treatments for a metal material, an inorganic material, or a transparent conductive material, and includes coating with an organic material, mask exposure, development, and other treatments for an organic material. The deposition may be any one or more of sputtering, evaporation, and chemical vapor deposition. The coating may be any one or more of spray coating, spin coating, and ink-jet printing. The etching may be any one or more of dry etching and wet etching, which is not limited in present disclosure. A "thin film" refers to a layer of thin film made of a material on a substrate through a process such as deposition and coating. If the "thin film" does not need a patterning process in an entire manufacturing process, the "thin film" may also be called a "layer". If the "thin film" needs a patterning process in an entire manufacturing process, it is called a "thin film" before the patterning process, and called a "layer" after the patterning process. The "layer" after the patterning process includes at least one "pattern". "A and B being disposed on a same layer" mentioned in the present disclosure means that A and B are formed simultaneously through a same patterning process, and a "thickness" of a film layer is a dimension of the film layer in a direction perpendicular to a display substrate. In an exemplary embodiment of the present disclosure, "an orthogonal projection of A includes an orthogonal projection of B" refers to that a boundary of the orthogonal projection of B falls within a boundary of the orthogonal projection of A, or the boundary of the orthogonal projection of A is overlapped with the boundary of the orthogonal projection of B.

In an exemplary embodiment, a manufacturing process of the touch panel may include following operations.

(1) A touch substrate is provided. In an exemplary embodiment, the touch substrate may be made of polyimide (PI), polyethylene terephthalate (PET) or over coat (OC).

(2) A pattern of a bridge layer is formed. In an exemplary embodiment, forming the pattern of the bridge layer may include sequentially depositing a first insulating thin film and a first metal thin film on a touch substrate, patterning the first metal thin film through a patterning process to form a first insulating layer covering the touch substrate and the pattern of the bridge layer disposed on the first insulating layer. The pattern of the bridge layer may include multiple connection bridges, the connection bridges may be in a form of metal meshes, and the connection bridges are configured to connect second touch electrodes to be formed subsequently. Because a flat region and a bending region have mutual capacitance structures, multiple connection bridges are located in the flat region and the bending region, and there is no pattern of the bridge layer provided in the deformation region with self-capacitance structure. In an exemplary embodiment, the pattern of the bridge layer may be referred to as a first metal mesh (TMA) layer.

(3) A pattern of a second insulating layer is formed. In an exemplary embodiment, forming the pattern of the second insulating layer may include depositing a second insulating thin film, patterning the second insulating thin film through a patterning process to form a second insulating layer covering the pattern of the bridge layer, the second insulating layer in the plane region and the bending region is provided with multiple vias, and the second insulating layer in the vias are etched to expose the connection bridges.

(4) A pattern of a metal mesh layer is formed. In an exemplary embodiment, forming the pattern of the metal mesh layer include depositing a second metal thin film, patterning the second metal thin film through a patterning process to form a pattern of a metal mesh layer on the second insulating layer, the pattern of the metal mesh layer may include multiple metal wires interwoven to form multiple metal meshes. In an exemplary embodiment, the pattern of the metal mesh layer may be referred to as a second metal mesh (TMB) layer.

In the flat region and the bending region, multiple metal meshes form a first touch electrode, a first touch lead, a second touch electrode and a second touch lead through notches. The first touch electrodes in a same row are directly connected with each other and connected with a first touch lead, and the second touch electrodes in a same column are connected with each other and connected with a second touch lead through vias formed on the second insulating layer to form a mutual capacitance structure.

In the deformation region, multiple metal meshes form touch electrodes and sub-leads through notches, and touch electrodes in a same row are directly connected with each other and connected with a sub-lead to form a self-capacitance structure.

(5) Patterns of a protection layer and crack guide grooves are formed. In an exemplary embodiment, forming the patterns of the protection layer and the crack guide grooves may include: coating an over coat thin film to form a protection layer covering the pattern of the metal mesh layer. Patterning the touch substrate, the first insulating layer, the second insulating layer and the protection layer in the deformation region a through a patterning process to form multiple crack guide grooves in the deformation region. The touch substrate, the first insulating layer, the second insulating layer and the protection layer in the multiple crack guide grooves are removed to form a through-hole structure.

The manufacturing process of this exemplary embodiment may be implemented by using the existing mature manufacture equipment, which has slight improvement on the existing processes, and may be well compatible with the existing manufacturing processes. The processes are easy to realize and easy to implement, with a high production efficiency, low production costs, and a high yield.

As may be seen from the structure and manufacturing process of the touch panel described above, according to the touch panel provided by the exemplary embodiment of the present disclosure, the mutual capacitance touch module is formed in the flat region and the bending region, the self-capacitance touch module is formed in the deformation region, and the deformation region is provided with the crack guide grooves, so that the single-layer electrode structure of a self-capacitance touch module has high overall strength against stresses. It can effectively avoid damages to touch electrodes, the crack guide grooves can control a direction of deformation of the deformation region during bending, thereby eliminating wrinkles or cracks caused by the bending, avoiding disconnection of electrodes and leads in the deformation region, ensuring touch control effects and improving reliability. By arranging the lead region between the electrode region of the deformation region and the bending region, the lead structure and structural layout are simplified, stresses acted on the leads during bending is minimized, poor touch control caused by disconnection of the leads is avoided, and touch control reliability is improved.

The present disclosure further provides a method for manufacturing a touch panel, wherein the touch panel includes a flat region, bending regions located on at least two adjacent sides of the flat region, and a deformation region located between the adjacent bending regions. In an exemplary implementation, the method may include steps of:

S1, forming a touch control structure in the flat region, the bending regions and the deformation region;

S2, forming at least two crack guide grooves in the deformation region, wherein shapes of the crack guide grooves include a strip shape extending along an extension direction on a plane parallel to the touch panel, and extension directions of the at least two crack guide grooves intersect with each other.

In an exemplary embodiment, step S1 may include forming mutual capacitance touch modules in the flat region, the bending regions and the deformation region.

In an exemplary embodiment, step S1 may include forming self-capacitance touch modules in the flat region, the bending regions and the deformation region.

In an exemplary embodiment, step S1 may include forming a mutual capacitance touch module in the flat region, and forming self-capacitance touch modules in the bending regions and the deformation region.

In an exemplary embodiment, step S1 may include forming mutual capacitance touch modules in the flat region and the bending regions, and forming a self-capacitance touch module in the deformation region.

In an exemplary embodiment, forming the self-capacitance touch module in the deformation region may include: forming a conductive layer on the touch substrate; wherein the conductive layer includes multiple electrode sub-regions and multiple lead sub-regions, the electrode sub-regions and the lead sub-regions are alternately arranged along a second direction, at least one electrode sub-region includes multiple touch electrodes sequentially arranged along a first direction, at least one lead sub-region includes multiple sub-leads sequentially arranged along the second direction, and the multiple sub-leads are correspondingly connected with the multiple touch electrodes.

In an exemplary embodiment, forming the self-capacitance touch module in the deformation region may include: forming a lead layer on the touch substrate, an insulating layer disposed on the lead layer and a conductive layer disposed on the insulating layer; wherein the lead layer includes multiple sub-leads sequentially arranged along the second direction, the conductive layer includes multiple touch electrodes sequentially arranged along the first direction, and the multiple touch electrodes are correspondingly connected with the multiple sub-leads through vias.

In an exemplary embodiment, forming the at least two crack guide grooves in the deformation region may include: forming a protection layer covering the touch control structure, and forming at least two crack guide grooves in the deformation region through a patterning process, at least one of the touch substrate, and the protection layer in the crack guide grooves is removed, or at least one of the touch substrate, the conductive layer and the protection layer in the crack guide grooves is removed.

In an exemplary embodiment, forming the at least two crack guide grooves in the deformation region may include: forming a protection layer covering the touch control structure, and forming at least two crack guide grooves in the deformation region through a patterning process, at least one of the touch substrate, the insulating layer and the protection layer in the crack guide grooves is removed, or at least one of the touch substrate, the insulating layer, the conductive layer and the protection layer in the crack guide grooves is removed.

The drawings of the present disclosure only involve structures involved in the present disclosure, and other structures may refer to conventional designs. The embodiments of the present disclosure and features in the embodiments may be combined to each other to obtain new embodiments if there is no conflict.

Those of ordinary skills in the art should understand that modifications or equivalent replacements may be made to the technical solutions of the present disclosure without departing from the spirit and scope of the technical solutions of the present disclosure, and shall all fall within the scope of the claims of the present application.

The invention claimed is:

1. A touch panel comprising a flat region, bending regions located on at least two adjacent sides of the flat region and a deformation region located between the adjacent bending regions; the flat region, the bending regions and the deformation region are provided with a touch control structure, and the deformation region is provided with at least two crack guide grooves; on a plane parallel to the touch panel, a shape of a crack guide groove comprises a strip shape extending along an extension direction, and extension directions of the at least two crack guide grooves intersect with each other, wherein the adjacent bending regions comprise a first bending region extending in a first direction and a second bending region extending in a second direction; the deformation region comprises a first sub-region adjacent to the first bending region, a second sub-region adjacent to the second bending region, and a central sub-region between the first sub-region and the second sub-region, wherein the first direction intersects with the second direction; and extension directions of the crack guide grooves in the first sub-region, the second sub-region and the central sub-region intersect with each other; and wherein a crack guide groove in the first sub-region has a strip shape extending along a first extension direction, and an included angle between the first extension direction and the first direction is 75 degrees to 105 degrees.

2. The touch panel according to claim 1, wherein a crack guide groove in the second sub-region has a strip shape extending along a second extension direction, and an included angle between the second extension direction and the second direction is 75 degrees to 105 degrees.

3. The touch panel according to claim 1, wherein a crack guide groove in the central sub-region has a strip shape extending along a third extension direction, and an included angle between the third extension direction and the first direction is 30 degrees to 60 degrees, or, an included angle between the third extension direction and the second direction is 30 degrees to 60 degrees.

4. The touch panel according to claim 1, wherein the extension directions of the crack guide grooves gradually change in a direction from the first sub-region to the second sub-region.

5. The touch panel according to claim 1, wherein the deformation region comprises an inner arc edge adjacent to the flat region and an outer arc edge away from the flat region, and an extension direction of at least one crack guide groove is perpendicular to the inner arc edge or perpendicular to the outer arc edge.

6. The touch panel according to claim 1, wherein the flat region, the bending regions and the deformation region are each provided with a mutual capacitance touch module; or, the flat region, the bending regions and the deformation region are each provided with a self-capacitance touch module; or, the flat region is provided with a mutual capacitance touch module, and the bending regions and the deformation region are provided with self-capacitance touch modules; or, the flat region and the bending regions are provided with mutual capacitance touch modules, and the deformation region is provided with a self-capacitance touch module.

7. The touch panel according to claim 6, wherein the self-capacitance touch module comprises a conductive layer disposed on a touch substrate and a protection layer disposed on a side of the conductive layer away from the touch substrate; the conductive layer comprises a plurality of electrode sub-regions and a plurality of lead sub-regions, the electrode sub-regions and the lead sub-regions are alternately arranged along a second direction, at least one electrode sub-region comprises a plurality of touch electrodes sequentially arranged along a first direction, at least one lead sub-region comprises a plurality of sub-leads sequentially arranged along the second direction, and the plurality of sub-leads are correspondingly connected with the plurality of touch electrodes; at least one of the touch substrate and the protection layer in the crack guide groove is removed, or at least one of the touch substrate, the conductive layer and the protection layer in the crack guide groove is removed.

8. The touch panel according to claim 6, wherein the self-capacitance touch module comprises a lead layer disposed on a touch substrate, an insulating layer disposed on a side of the lead layer away from the touch substrate, a conductive layer disposed on a side of the insulating layer away from the touch substrate and a protection layer disposed on a side of the conductive layer away from the touch substrate; the lead layer comprises a plurality of sub-leads sequentially arranged along a second direction, the conductive layer comprises a plurality of touch electrodes sequentially arranged along a first direction, and the plurality of touch electrodes are correspondingly connected with the plurality of sub-leads through vias; at least one of the touch substrate, the insulating layer and the protection layer in the crack guide grooves is removed, or at least one of the touch substrate, the insulating layer, the conductive layer and the protection layer in the crack guide grooves is removed.

9. The touch panel according to claim 1, wherein the deformation region comprises an electrode region and a lead region, and the electrode region comprises the first sub-region, the second sub-region and the central sub-region; the lead region at least comprises a lead region between the electrode region and the first bending region and a lead region between the electrode region and the flat region.

10. The touch panel according to claim 1, wherein the flat region, the bending regions and the deformation region are each provided with a mutual capacitance touch module; or, the flat region, the bending regions and the deformation region are each provided with a self-capacitance touch module; or, the flat region is provided with a mutual capacitance touch module, and the bending regions and the deformation region are provided with self-capacitance touch modules; or, the flat region and the bending regions are provided with mutual capacitance touch modules, and the deformation region is provided with a self-capacitance touch module.

11. The touch panel according to claim 1, wherein the flat region, the bending regions and the deformation region are each provided with a mutual capacitance touch module; or, the flat region, the bending regions and the deformation region are each provided with a self-capacitance touch module; or, the flat region is provided with a mutual capacitance touch module, and the bending regions and the deformation region are provided with self-capacitance touch modules; or, the flat region and the bending regions are provided with mutual capacitance touch modules, and the deformation region is provided with a self-capacitance touch module.

12. A display touch apparatus, comprising the touch panel according to claim 1.

13. A method for manufacturing a touch panel, wherein the touch panel comprises a flat region, bending regions located on at least two adjacent sides of the flat region, and a deformation region located between the adjacent bending regions, and the method comprises:
    forming a touch control structure in the flat region, the bending regions and the deformation region; and
    forming at least two crack guide grooves in the deformation region; wherein on a plane parallel to the touch panel, a shape of a crack guide groove comprises a strip shape extending along an extension direction, and extension directions of the at least two crack guide grooves intersect with each other,
    wherein the adjacent bending regions comprise a first bending region extending in a first direction and a second bending region extending in a second direction; the deformation region comprises a first sub-region adjacent to the first bending region, a second sub-region adjacent to the second bending region, and a central sub-region between the first sub-region and the second sub-region, wherein the first direction intersects with the second direction; and extension directions of the crack guide grooves in the first sub-region, the second sub-region and the central sub-region intersect with each other; and
    wherein a crack guide groove in the first sub-region has a strip shape extending along a first extension direction, and an included angle between the first extension direction and the first direction is 75 degrees to 105 degrees.

14. The method according to claim 13, wherein forming the touch control structure in the flat region, the bending regions and the deformation region comprises:
    forming mutual capacitance touch modules in the flat region, the bending regions and the deformation region; or,
    forming self-capacitance touch modules in the flat region, the bending regions and the deformation region; or
    forming a mutual capacitance touch module in the flat region, and forming self-capacitance touch modules in the bending regions and the deformation region; or,
    forming mutual capacitance touch modules in the flat region and the bending regions, and forming a self-capacitance touch module in the deformation region.

15. The method according to claim 14, wherein
    forming the self-capacitance touch module in the deformation region comprises: forming a conductive layer on the touch substrate; wherein the conductive layer comprises a plurality of electrode sub-regions and a plurality of lead sub-regions, the electrode sub-regions and the lead sub-regions are alternately arranged along a second direction, at least one electrode sub-region comprises a plurality of touch electrodes sequentially arranged along a first direction, at least one lead sub-region comprises a plurality of sub-leads sequentially arranged along the second direction, and the plurality of sub-leads are correspondingly connected with the plurality of touch electrodes; and
    forming the at least two crack guide grooves in the deformation region comprises: forming a protection layer covering the touch control structure, and forming the at least two crack guide grooves in the deformation region through a patterning process, at least one of the touch substrate and the protection layer in the crack guide grooves is removed, or at least one of the touch substrate, the conductive layer and the protection layer in the crack guide grooves is removed.

16. The method according to claim 14, wherein
    forming the self-capacitance touch module in the deformation region comprises: forming a lead layer on a touch substrate, an insulating layer disposed on the lead layer and a conductive layer disposed on the insulating layer; the lead layer comprises a plurality of sub-leads sequentially arranged along a second direction, the conductive layer comprises a plurality of touch electrodes sequentially arranged along a first direction, and the plurality of touch electrodes are correspondingly connected with the plurality of sub-leads through vias; and forming the at least two crack guide grooves in the deformation region comprises: forming a protection layer covering the touch control structure, and forming at least two crack guide grooves in the deformation region through a patterning process, at least one of the touch substrate, the insulating layer and the protection layer in the crack guide grooves is removed, or at least one of the touch substrate, the insulating layer, the conductive layer and the protection layer in the crack guide grooves is removed.

17. A touch panel comprising a flat region, bending regions located on at least two adjacent sides of the flat region and a deformation region located between the adjacent bending regions; the flat region, the bending regions and the deformation region are provided with a touch control structure, and the deformation region is provided with at least two crack guide grooves; on a plane parallel to the touch panel, a shape of a crack guide groove comprises a strip shape extending along an extension direction, and extension directions of the at least two crack guide grooves intersect with each other, wherein a length of a crack guide groove in the extension direction is greater than a width of the crack guide groove in a direction perpendicular to the extension direction, and a ratio of the length to the width is 3 to 7.

18. The touch panel according to claim 17, wherein the length is 40 μm to 60 μm and the width is 8 μm to 12 μm.

* * * * *